US011985235B2

(12) United States Patent
Obadia et al.

(10) Patent No.: US 11,985,235 B2
(45) Date of Patent: May 14, 2024

(54) QUANTUM COMMUNICATION SYSTEM

(71) Applicant: Quantum Technologies Laboratories, Inc., New York, NY (US)

(72) Inventors: Alain Obadia, New York, NY (US); Adrien Hubert, New York, NY (US)

(73) Assignee: Quantum Technologies Laboratories, Inc., New York, NY (US)

(*) Notice: Subject to any disclaimer, the term of this patent is extended or adjusted under 35 U.S.C. 154(b) by 141 days.

(21) Appl. No.: 17/023,165

(22) Filed: Sep. 16, 2020

(65) Prior Publication Data

US 2021/0083865 A1  Mar. 18, 2021

Related U.S. Application Data

(60) Provisional application No. 62/900,679, filed on Sep. 16, 2019.

(51) Int. Cl.
*H04L 9/08* (2006.01)
*G06F 7/58* (2006.01)
*H04B 10/70* (2013.01)

(52) U.S. Cl.
CPC ............ *H04L 9/0855* (2013.01); *G06F 7/588* (2013.01); *H04B 10/70* (2013.01); *H04L 9/0858* (2013.01)

(58) Field of Classification Search
None
See application file for complete search history.

(56) References Cited

U.S. PATENT DOCUMENTS

| | | | | |
|---|---|---|---|---|
| 7,284,133 B2* | 10/2007 | Watanabe | ............. | G07F 7/1008 713/189 |
| 11,196,550 B2* | 12/2021 | Yuan | ..................... | H04L 9/0662 |
| 2002/0152392 A1* | 10/2002 | Hardy | ................... | H04L 9/0891 713/189 |
| 2011/0093712 A1* | 4/2011 | Jin, II | ................... | H04W 12/50 713/171 |
| 2011/0216902 A1* | 9/2011 | Kolesnikov | ........... | H04L 9/0631 380/47 |
| 2013/0083926 A1* | 4/2013 | Hughes | ................. | H04L 9/3247 380/278 |
| 2013/0243187 A1* | 9/2013 | Horstmeyer | ............. | G09C 1/00 380/28 |
| 2016/0359626 A1* | 12/2016 | Fu | ......................... | H04L 9/0858 |
| 2020/0274701 A1* | 8/2020 | Yuan | ..................... | H04L 9/0841 |

(Continued)

OTHER PUBLICATIONS

D. Chaffee (2017), Earth-to-Satellite Quantum Key Distribution with Noise Re-duction via Entangled Photon Time Correlation. University of Illinois-Urbana Champaign.

(Continued)

*Primary Examiner* — Trang T Doan
(74) *Attorney, Agent, or Firm* — Crowell & Moring LLP

(57) ABSTRACT

A quantum communication system for encrypting communication includes a processor configured to receive an encryption request from a mobile device. The mobile device determines a first encryption key from the mobile device. A quantum random number generator generates a second encryption key using quantum mechanics. The processor transmits the second encryption key to the mobile device. The mobile device implements a digital XOR logic gate configured to perform an XOR operation on the first encryption key and the second encryption key to generate a third encryption key.

8 Claims, 31 Drawing Sheets

(56) References Cited

U.S. PATENT DOCUMENTS

| | | | |
|---|---|---|---|
| 2020/0351087 A1* | 11/2020 | Mccandlish | H04L 9/0891 |
| 2021/0044433 A1* | 2/2021 | Hay | H04L 9/0855 |
| 2022/0200655 A1* | 6/2022 | Abdelmoneum | G09C 1/00 |

OTHER PUBLICATIONS

ID Quantique (2010) White Paper, Random Number Generation Using Quantum Physics, pp. 1-8.
A. Kohnle and A. Rizzoli (2016), Interactive simulations for quantum key distribution, pp. 1-21.
W. Wooters and W. Zurek (1982), A single quantum cannot be cloned. Nature 299 pp. 802-803.
Jain, R. A Survey of the Prominent Quantum Key Distribution Protocols.
ID Quantique Quantum-Safe Security White Paper (2020): Understanding Quantum Cryptography, pp. 1-16.
ID Quantique is happy to join the Satellite Cybersecurity Consortium led by SES with the goal to develop a Quantum Cryptography Telecommunication System (Quartz) (2018).
Quintessence Labs White Paper(2018), What is QKD? pp. 1-11.
Quintessence Labs White Paper(2018), QKD Systems Compared, pp. 1-6.
Quantum Flagship-Quantum Repeaters.

* cited by examiner

| A | B | A XOR B |
|---|---|---------|
| 0 | 0 | 0 |
| 0 | 1 | 1 |
| 1 | 0 | 1 |
| 1 | 1 | 0 |

FIG. 3A

QUANTUM COMMUNICATION SYSTEM

CROSS-REFERENCE TO RELATED APPLICATION

This application claims the benefit of and priority to U.S. Provisional Patent Application No. 62/900,679 filed Sep. 16, 2019. The entire contents and substance of the above application is incorporated herein by reference in its entirety as if fully set forth below

FIELD

The present invention relates to voice, messaging communication, file sharing, mail and VPN systems based on quantum encryption.

BACKGROUND

Encryption is used to ensure the confidentiality, integrity, authentication and non-repudiation of data. It ensures that your data remains secret, that nobody has tampered with it, that it was sent to the right person in the right order and that you can prove who sent it.

Encryption represents the best line of defense against data breaches—ensuring that the data itself is rendered useless if it falls into unauthorized hands. In fact, encryption is increasingly mandated by new data protection rules. However, not all encryption solutions are created equal.

Several encryption algorithms exist such as DES (Data Encryption Standard), and AES (Advanced Encryption Standard). Their relative strengths essentially depend on the length of the key they use. The more bits the key contains, the better security.

The length key of the DES algorithm is only 56 bits, the length key of the AES algorithm is at least 128 bits. So, the AES algorithm is more secure than the DES algorithm.

In addition to its length, the amount of information encrypted with a given key also influences the strength of the scheme. In general, the more often the key is changed, the better the security.

In commercial applications, the encryption algorithm is normally public with the effectiveness of the encryption deriving from the fact that the key is secret.

This means firstly, that the key generation process must be appropriate, in the sense that it must not be possible for a third party to guess or deduce it. Truly random numbers must thus be used for the key.

Secondly, it must not be possible for a third party to intercept the secret key during its exchange between the sender and the recipient. This so-called "key distribution problem" is absolutely central in cryptography.

Even the most modern form of encryption is primarily based on the assumption that the mathematical models used to encrypt are too complex to decode without access to an extremely large computing power beyond the realms of today's classical computers.

Unfortunately, with the advent of massively powerful quantum computers in the next decade, such as the ones built by IBM or Google, such assumptions will no longer hold true.

Much of today's encryption will become vulnerable as quantum computers may solve complex optimization problems many orders of magnitude faster than a single-core classic computer.

In view of the foregoing, a need exists for an enhanced, robust encryption mechanism for communications that overcomes vulnerabilities presented in the existing encryption mechanism. Embodiments of the present disclosure are directed to this and other considerations.

SUMMARY

Aspects of the disclosed technology include systems and methods for crowdsourcing annotations for transactions. Consistent with the disclosed embodiments, a quantum random number generator configured to generate an encryption key. An optical subsystem may include at least one optical element to implement a random process and generate a random outcome. A synchronization and acquisition subsystem may implement an electronic circuit to control the optical subsystem and acquire the random output from the optical subsystem. A processing and interfacing subsystem may perform status check on the random output acquired by the synchronization and acquisition subsystem, and generate the encryption key based on the output acquired by the synchronization and acquisition subsystem.

In one embodiment, the optical subsystem may include a light emitting diode configured to produce photons, a transmission element where a random process takes place, and two single-photon detectors to record the random outcome.

In one embodiment, the single-photon detectors have a single-photon resolution.

In one embodiment, the synchronization and acquisition subsystem includes a clock and triggering electronics for photon source.

In one embodiment, the synchronization and acquisition subsystem includes acquisition electronics for the single-photon detectors.

In one embodiment, the processing and interfacing subsystem is configured to perform status check, unbiasing and interfacing.

In one embodiment, the processing and interfacing subsystem is configured to shape an output electronic signal.

Another aspect of the disclosed technology relates to a quantum communication system for encrypting communication. A processor is configured to receive an encryption request from a mobile device. The mobile device determines a first encryption key. A quantum random number generator is configured to generate a second encryption key using quantum mechanics. The processor transmits the second encryption key to the mobile device. The mobile device implements a digital XOR logic gate configured to perform an XOR operation on the first encryption key and the second encryption key to generate a third encryption key.

In one embodiment, the third encryption key encrypts data communication including one or more of the following: voice, message, file sharing, mail, and VPN.

In one embodiment, the first encryption key is generated by on-board security in the mobile device.

In one embodiment, the processor verifies credentials of a user of the mobile device, wherein the credentials include phone number and email address.

In one embodiment, the processor transmits the second encryption key to the mobile device over HTTPS.

In one embodiment, the mobile device includes a quantum voice app that implements the digital XOR logic gate to generate the third encryption key.

In one embodiment, the quantum voice app synchronizes the third encryption key with other users of the quantum voice app.

In one embodiment, the quantum voice app encrypts communication with users of other mobile devices using the third encryption key.

A further aspect of the disclosed technology relates to a method for encrypting communication. The method may include receiving an encryption request from a mobile device, and determining a first encryption key by the mobile device. A second encryption key is generated by a quantum random number generator using quantum mechanics, and is then transmitted to the mobile device. A digital XOR logic gate implemented on the mobile device may perform an XOR operation on the first encryption key and the second encryption key to generate a third encryption key. Communication may be encrypted between the mobile device and other mobile devices using the third encryption key.

Further features of the present disclosure, and the advantages offered thereby, are explained in greater detail hereinafter with reference to specific embodiments illustrated in the accompanying drawings, wherein like elements are indicated by like reference designators.

BRIEF DESCRIPTION OF THE DRAWINGS

Reference will now be made to the accompanying drawings, which are not necessarily drawn to scale, and which are incorporated into and constitute a portion of this disclosure, illustrate various implementations and aspects of the disclosed technology and, together with the description, explain the principles of the disclosed technology. In the drawings:

FIG. 3A illustrates an example XOR function.

DETAILED DESCRIPTION

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It is also to be understood that the mention of one or more method steps does not preclude the presence of additional method steps or intervening method steps between those steps expressly identified.

Reference will now be made in detail to exemplary embodiments of the disclosed technology, examples of which are illustrated in the accompanying drawings and disclosed herein. Wherever convenient, the same references numbers will be used throughout the drawings to refer to the same or like parts.

Figure 1:
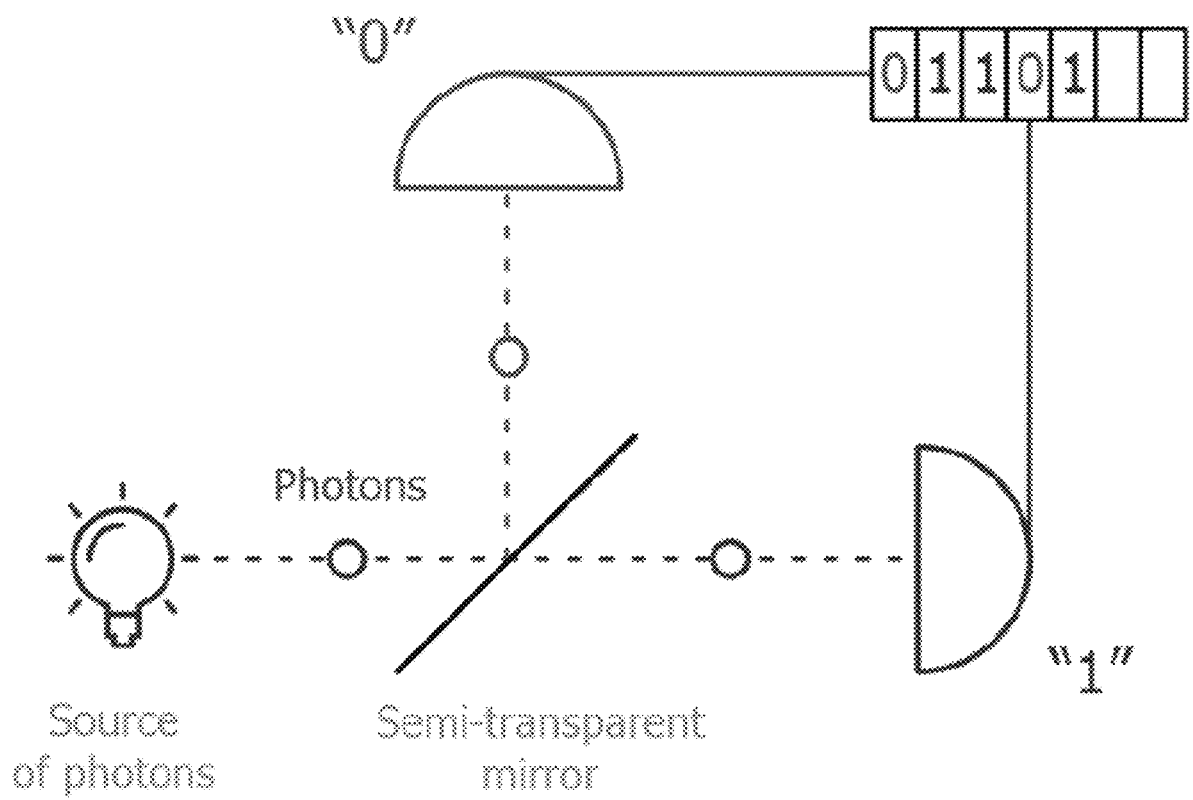
FIG. 1 is a diagram illustrating an optical system used to generate binary, purely random numbers.

FIG. 1 is a diagram illustrating the optical system used to generate binary, purely random numbers (bit rate of 16 Mb/sec). Referring to FIG. 1, optics is the science of light. From a quantum physics point of view, light consists of elementary "particles" called photons. Photons exhibit in certain situations a random behavior. One such situation, which is very well suited to the generation of binary random numbers, is the transmission upon a semi-transparent mirror.

The fact that a photon incident on such a component be reflected or transmitted is intrinsically random and cannot be influenced by any external parameters.

The photons in the optical system described in FIG. 1 are in a super-position (linear combination of the corresponding ket vectors) of states (transmission or reflection) until they are measured, when they jump entirely into one of the two states. In a quantum key distribution (QKD) scheme, an interceptor attempting to measure the photon will introduce errors in the bit sequence, which are checked and tested for. QKD is a method that uses the principles of quantum mechanics to secure key distribution; in particular to safely distribute a shared secret key that two parties will use to encrypt and decrypt messages. This secret key may be a one-time pad, an unconditionally secure, cryptographic protocol wherein plain text is combined with a key having the same length as the plain text to produce cipher-text via the XOR function; that is, the algorithm is the XOR function.

A random quantum process may include transmission or reflection of a photon on a semi-transparent mirror, which falls under the domain of optics. The transmission or reflection is the random outcome that produces binary random numbers, such as 1 for transmission and 0 for reflection.

Figure 2:
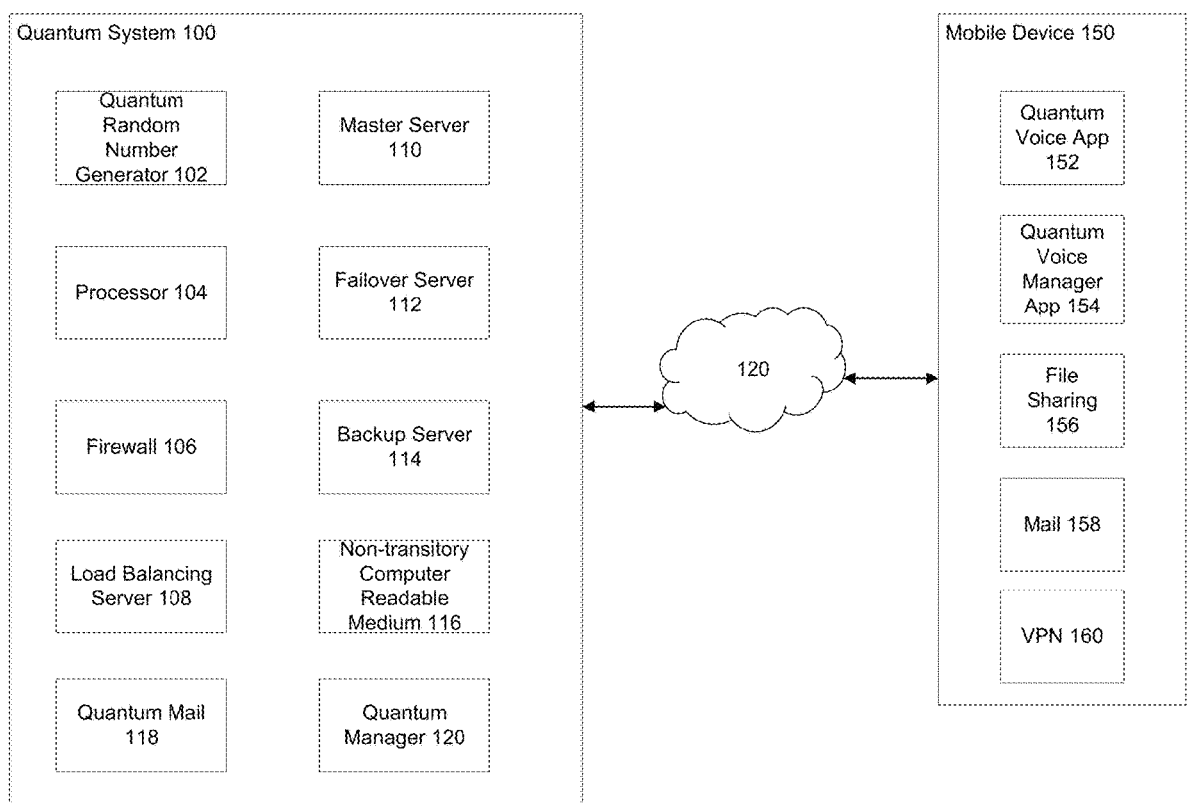
FIG. 2 illustrates an example quantum system according to one aspect of the disclosed technology.

FIG. 2 shows an example environment that may implement certain aspects of the present disclosure. The components and arrangements shown in FIG. 2 are not intended to limit the disclosed embodiments as the components used to implement the disclosed processes and features may vary. As shown in FIG. 2, a quantum system 100 may include a collection of servers which exist to provide a seamless backend to Signal for users. The quantum system 100 may be used to send and receive messages, and may serve as the initial routing point for voice communications.

As shown in FIG. 2, in some implementations, the quantum system 100 may include one or more of the following: a quantum random number generator (QRNG) 102, a processor 104, a firewall 106, a load balancing server 108, a master server 110, a failover server 112, a backup server 114, a non-transitory computer readable medium 116, quantum mail 118 and quantum manager 120. The quantum system 100 may include a Quantum Entropy as a Service server. The quantum system 100 may communicate with one or more mobile devices 150. The mobile device may include one or more of the following: a quantum voice app 152, a quantum voice manager app 154, a file sharing app 156, a mail app 156 and virtual private network (VPN) 160. The mobile device 150 may connect to the quantum system 100 over an HTTPS encrypted connection.

Figure 3:
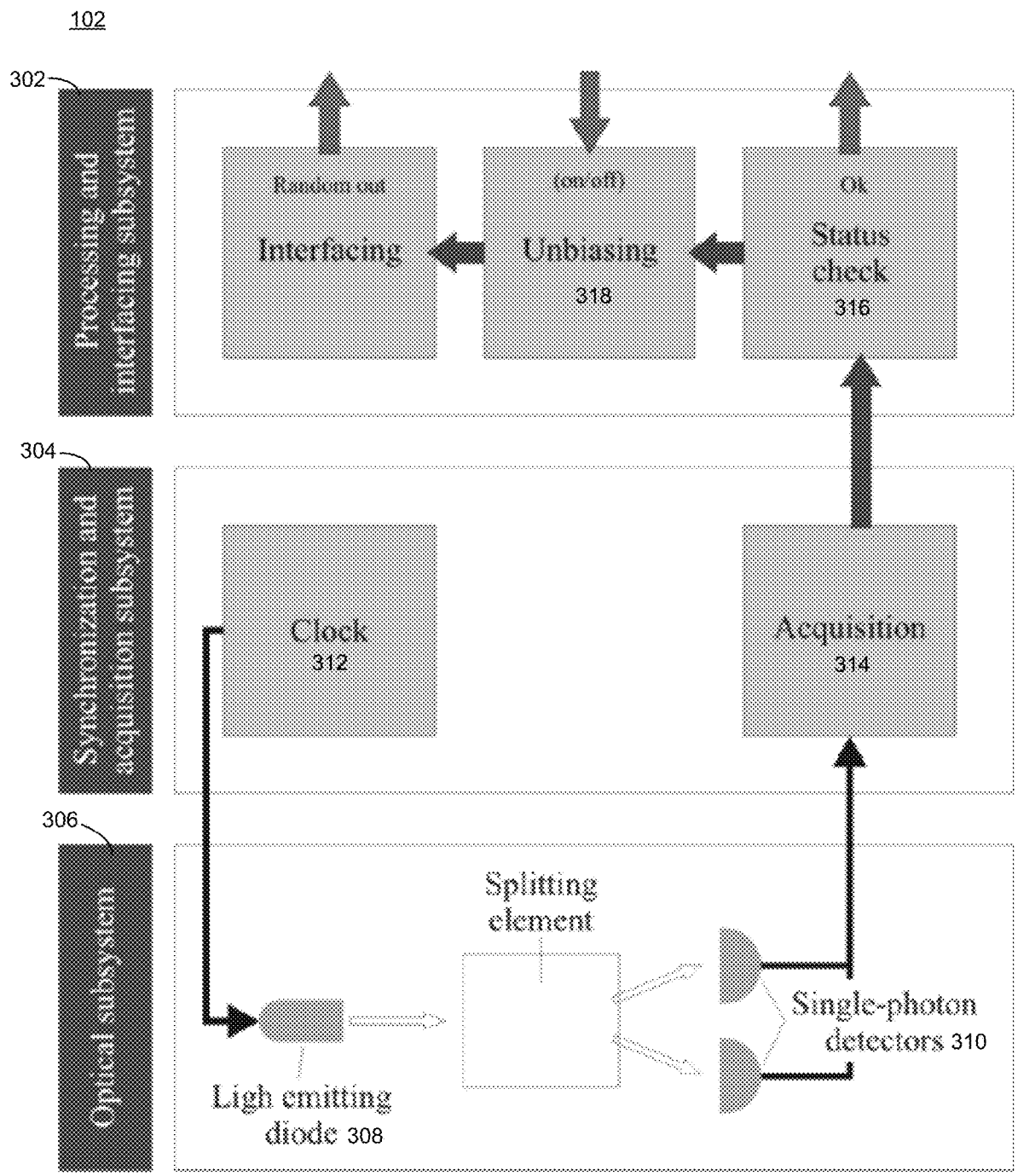
FIG. 3 illustrates an example quantum random number generator according to one aspect of the disclosed technology.
Figure 3A:
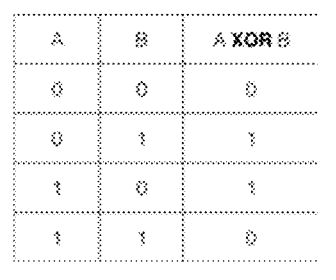

The QRNG 102 may rely on quantum physics to produce a high bit rate of 16 Mb/sec of truly random bits. As illustrated in FIG. 3, the QRNG 102 may include three subsystems, including a processing and interfacing subsystem 302, a synchronization and acquisition subsystem 304, and an optical subsystem 306. The optical subsystem 306 may be the core of the generator 102 and may contain the optical elements that are used to implement the random process and produce the random outcomes. The QRNG 102 generates random bits 0 or 1 which are sent bit by bit, one at a time, over QKD as a single photon with a unique spin or angle to another QKD. If there is a discrepancy in the spin or angle of the photon, it is a sign that it has been intercepted and that bit is discarded. The optical subsystem 306 may include a light emitting diode 308 producing the photons, a transmission element, where the random process takes place, and two single-photon detectors 310—detectors with single-photon resolution—to record the outcomes. The optical subsystem 306 may be controlled by the synchronization and acquisition subsystem 304. The synchronization and acquisition subsystem 304 may be an electronic circuit. This subsystem 304 may include a clock 312 and triggering electronics for the photon source, as well the acquisition electronics 314 for the single-photon detectors 310. The photon source may be an LED that generates photons randomly, which are filtered by their spin or angle into two different receptors, which then generate a 0 or a 1 based on which receptor they hit. The processing and interfacing subsystem 302 may perform statistical and hardware checks 316, as well as unbiasing 318 of the sequence. FIG. 3C illustrates how the photons are separated, unbiased, and how it shapes the output of the electronic signal. The processing and interfacing subsystem 302 may shape the output electronic signals.

This method performed by QRNG 102 may be one of the ways to perform symmetric encryption, where the same key may be used to encrypt and decrypt.

The QRNG 102 may be inviolable if the sequence of bits of the key is really random. The latter must also be used only once.

The encryption performed by the QRNG 102 may be used for one or more of the following: voice, text, message, image, file, and mail transmissions, as well as VPN. With reference to FIG. 2, the QRNG 102 may be used in conjunction with one or more apps on the mobile device 150, including the quantum voice app 152, the file sharing app 156, the mail app 158 and the VPN 160. All apps may securely encrypt communications end to end, regardless of what connection used for the internet, including but not limited to Wi-Fi and mobile network.

The quantum voice app 152 may be a messaging application that uses quantum entropy in the end to-end encryption process. The result of the addition of entropy to the encryption process is plenty of randomness, unpredictability and disorder. This makes the key unguessable and inaccessible, hence the encryption process is much more secure.

Using voice transmission as an example, to secure voice communication, the quantum voice app 152 may provide, a first key generated by the on-board security in mobile device 150, and a second key, such as a string, generated by the QRNG 102. The first key generated by on-board security in the mobile device 150 may be combined with the second key generated by the QRNG 102, using a digital logic gate called XOR, to provide a third encryption key, which is a true output when a number of true inputs is odd.

Every time the mobile device 150 generates the first key via a Signal protocol. The Signal protocol source code may integrate with Quantum Entropy as a Service (QEAAS) in the quantum voice app 152. Whenever there is an encryption key or the first key generated by the mobile device 150, the code which produces the password on the device (Signal-CoreKit) may obtains the second encryption key from the quantum system 100, particularly, the QRNG 102, and XORs it with the first key generated by the mobile device 150.

This first key may be merged via XOR with the second key generated by the QRNG 102, to produce the third key, which adds an extra layer of security to the encryption. For example, the second key or the string generated by the QRNG 102 may be encrypted with https and sent back to the mobile device 150. The QRNG 102 may be connected to a web server, which is connected to the Internet. The web server may generate and manage encryption keys for https connections. Once the mobile device 150 receives the second key from the QRNG 102, the mobile device 150 may merge the second key with the first key using an XOR function. An XOR function may perform what is called "exclusive OR". With reference to FIG. 3A, XOR, or Exclusive Or, returns True (\1") if either statement is True, but False (\0") if they are both True or both False. If neither is TRUE, XOR also returns FALSE. Taking one bit (0 or 1) and adding it to another bit (0 or 1), it provides a 3rd number which does not give away either of the other keys. For example, if A XOR B=0, it would be impossible to determine if A=0 or A=1 unless B is known. The third key may be used to encrypt data.

The QRNG 102 may provide the added benefit of true entropy while keeping the benefits of the existing pseudoentropy already provided by the mobile device 150. If either were to be compromised, even though this may be considered unlikely, it would provide the extra layer of security which ultimately keeps data private.

In the example of encrypting transmission by the quantum voice app 152, the mobile device 150 may generate the first encryption key. During security communication, the server or the quantum system 100 may receive an encryption request from the mobile phone 150. The quantum system 100 may obtain the first encryption key from the mobile phone 150. The server may verify all credentials of the user of the mobile device 150, such as phone number, and email address, against all known users. The quantum voice app 152 may have multi-factor contact management, using email and phone number to verify a user's identify and those of the user's contacts.

The server 100, particularly, the QRNG 102, may generate the second key using quantum mechanics, ensuring perfect entropy. The QRNG 102 may send back the second key over HTTPS to the mobile device 150. The quantum voice app 152 may generate the third key on the mobile device 150 by performing an XOR operation of the first encryption key and the second key. The quantum voice app 152 may then synchronize keys with other users of quantum voice app 152, protected against local device entropy failure.

The quantum voice app 152 may be based on the Signal protocol by Open Whisper Systems. The quantum voice app 152 may drastically augment the security of Signal by restricting conversations inside of organizations by their email domain. Further, the use of the QRNG 102 may provide true entropy.

The quantum voice app 152 may provide its clients the ability to speak outside their organization. While the quantum voice app 152 may have all operational features of Signal for iOS, the app 152 may also include managerial account control and contact management. The accounts may be paired to the first device they connect with. If a user logs in with a new device, all their contacts in the app 152 may be notified and must accept the new equipment before any further communications occur. Accounts may sign in on a device one time (initial pairing), after which the user can only use this device.

The quantum voice app 152 may create a jailed environment which is managed by an administrator or a manager. To set up users and permissions, the administrator may use the quantum voice manager app 154, available only to the administrator for each account.

The quantum voice app 152 may perform the following actions. The quantum voice app 152 may allow a user or a customer of an organization to sign in. During the sign-in process, the app 152 may exchange keys with the quantum system 100, encrypt payload to server key, and send payload and get response from the quantum system 100. If response is successful, the app 152 may save server public key and current private key to the mobile device 150. If response is not successful, the app 152 may relay error to user. In public-private (asymmetric) key cryptography, the public key is always generated using a private key. Here, the private key is generated by creating a key on the mobile device, and one with QRNG (which is sent over HTTPS). The key created by the mobile device and the key generated by the QRNG are combined to create the third key.

The app 152 may allow the user or customer to sign out. During the sign-out process, the app 152 may sign request with current private key, encrypt payload to server key, send payload and get response from the server or the quantum system 100. If response is successful, the app 152 may delete keys from the mobile device 150. If response is not successful, the app 152 may relay error to the user.

The app 152 may sync permissions. During the sync permissions process, the app 152 may sign request with current private key, encrypt payload to server key, send payload and get response from the quantum system 100. If response is successful, the app 152 may update permissions on device. If the response is not successful, the app 152 may relay error to the user. The app 152 may recreate keys with the quantum system 100 and update on the mobile device 150.

The app 152 may send messages. During this process, the app 152 may check local permissions for sending message to contact. The app 152 may sign request with current private key. This current private key is the third key, created by combining the key provided by the mobile device and the key generated by the QRNG. The app 152 may encrypt payload to server key. The app 152 may send payload and get response from the quantum system 100. If response is successful, the app 152 may mark message as sent on the mobile device 150. If response is not successful, the app 152 may relay error to the user. The app 152 may recreate keys with the quantum system 100 and update on the mobile device 150.

The app 152 may receive messages. During this process, the app 152 may get push notification. The app may sign request with current private key. The app 152 may encrypt payload to server key. The app may send payload and get response from the quantum system 100. If response is success, the app 152 may download message. The app 152 may alert user about message. The app 152 may recreate keys with the quantum system 100 and update on the mobile device 150.

The app 152 may send file. During this process, the app 152 may check local permissions for sending file to contact. The app 152 may sign request with current private key. The app 152 may encrypt payload to server key. The app may send payload and get response from the quantum system 100. If response is successful, the app 152 may mark file as sent on the mobile device 150. The app 152 may recreate keys with the quantum system 100 and update on the mobile device 150.

The app 152 may receive file. During this process, the app 152 may get push notification, sign request with current private key, encrypt payload to server key, send payload and get response from the quantum system 100. If response is successful, the app 152 may download file. The app 152 may recreate keys with the quantum system 100 and update on the mobile device 150. The app 152 may alert user about file.

The app 152 may start call. During this process, the app 152 may check local permissions for making call to contact. The app 152 may sign request with current private key. The app 152 may encrypt payload to server key. The app 152 may send payload and get response from the quantum system 100. If response is successful, the app 152 may queue call and open call screen. The app 152 may check every second to see if call is scheduled. If scheduled, the app 152 may connect to call. At end of call, the app 152 may recreate keys with the quantum system 100 and update on the mobile device 150.

The app 152 may receive call. During this process, the app 152 may get push notification, sign request with current private key, encrypt payload to server key, send payload and get response from the quantum system 100. If response is successful, the app 152 may check for scheduled call. The app 152 may continue to check every second to see if call is scheduled. If scheduled, the app 152 may connect to call. At end of call, the app 152 may recreate keys with the quantum system 100 and update on the mobile device 150.

The quantum voice manager app 154 may be coded from scratch, and may be used to create or remove users, as well as purchase and modify subscriptions. In one example, subscriptions and payments may be processed through the App Store.

The quantum voice manager app 154 may allow the administrator or manager to create account. During this process, the app 154 may exchange keys with the server or the quantum random generator 102. The app 154 may encrypt payload to server key. The app 154 may send payload and get response from the server or the quantum system 100. If response is successful, the app 154 may save server public key and current private key to the mobile device 150. If response is not successful, the app 154 may relay error to the administrator.

The quantum voice manager app 154 may allow the administrator to create a payment profile. The app 154 may sign request with current private key. The app 154 may encrypt payload to server key. The app 154 may send payload and get response from the server or the quantum system 100. If response is successful, the app 154 may update payment information on device. If response is not successful, the app 154 may relay error to the administrator. The app 154 may recreate keys with the server or the quantum system 100 and update on the mobile device 150.

The quantum voice manager app 154 may allow the administrator or the manager to add or remove licenses (update payment profile). The app 154 may sign request with current private key. The app 154 may encrypt payload to server key. The app 154 may send payload and get response from the server or the quantum system 100. If response is successful, the app 154 may update license information on the mobile device 150. Otherwise, the app 154 may relay error to the manager. The app 154 may recreate keys with the server or the quantum system 100 and update on the mobile device 150.

The quantum voice manager app 154 may allow the administrator or the manager to delete payment profile. The app 154 may sign the manager's request with current private key. The app 154 may encrypt payload to server key. The app 154 may send payload and get response from the server or the quantum system 100. If response is successful, the app 154 may remove payment information on the mobile device 150. Otherwise, the app 154 may relay error to the administrator or the manager. The app 154 may recreate keys with the server or the quantum system 100 and update on the mobile device 150.

The quantum voice manager app 154 may allow the administrator or the manager to create organization. The app 154 may sign request with current private key, encrypt payload to server key, and send payload and get response from the server or the quantum system 100. If response is successful, the app 154 may update organization list from the server or the quantum system 100 and return to main page. If response is not successful, the app 154 may relay error to the administrator or the manager. The app 154 may recreate keys with the server or the quantum system 100 and update on the mobile device 150.

The quantum voice manger app 154 may allow the administrator or the manager to edit organization. The app 154 may sign the manger's request with current private key. The app 154 may encrypt payload to server key. The app 154 may send payload and get response from the server or the quantum system 100. If response is successful, the app 154 may update organization list from the server or the quantum system 100 and return to main page. If response is not successful, the app 154 may relay error to the administrator. The app 154 may recreate keys with the server or the quantum system 100 and update on the mobile device 150.

The quantum voice manger app 154 may allow the administrator or the manager to delete organization. The app 154 may make sure all users are removed from organization. If any users are in organization, the remove organization button may not be visible. If the request is submitted, the app 154 may return error. The app 154 may sign request with current private key. The app 154 may encrypt payload to server key. The app 154 may send payload and get response from the server or the quantum system 100. If response is successful, the app 154 may update organization list from the server or the quantum system 100 and return to main page. If response is not successful, the app 154 may relay error to user. The app 154 may recreate keys with the server or the quantum system 100 and update on the mobile device 150.

The quantum voice manager app 154 may allow the administrator or the manager to add user. The app 154 may sign the administrator's request with current private key. The app 154 may encrypt payload to server key. The app 154 may send payload and get response from the server or the quantum system 100. If response is successful, the app 154 may update user list on the mobile device 150. If the response is not successful, the app 154 may relay error to the administrator. The app 154 may recreate keys with the server or the quantum system 100 and update on the mobile device 150.

The quantum voice manager app 154 may allow the administrator or the manager to edit users. The app 154 may sign the administrator's request with current private key. The app 154 may encrypt payload to server key. The app 154 may send payload and get response from the server or the quantum system 100. If response is successful, the app 154 may update user list on the mobile device 150. If response is not successful, the app 154 may relay error to the administrator. The app 154 may recreate keys with the server or the quantum system 100 and update on the mobile device 150.

The quantum voice manger app 154 may allow the administrator or the manager to remove users. The app 154 may sign the administrator's request with current private key. The app 154 may encrypt payload to server key. The app 154 may send payload and get response from the server or the quantum system 100. If response is successful, the app 154 may update user list on the mobile device 150. If response is not successful, the app 154 may relay error to the administrator. The app 154 may recreate keys with the server or the quantum system 100 and update on the mobile device 150.

Figure 3B:
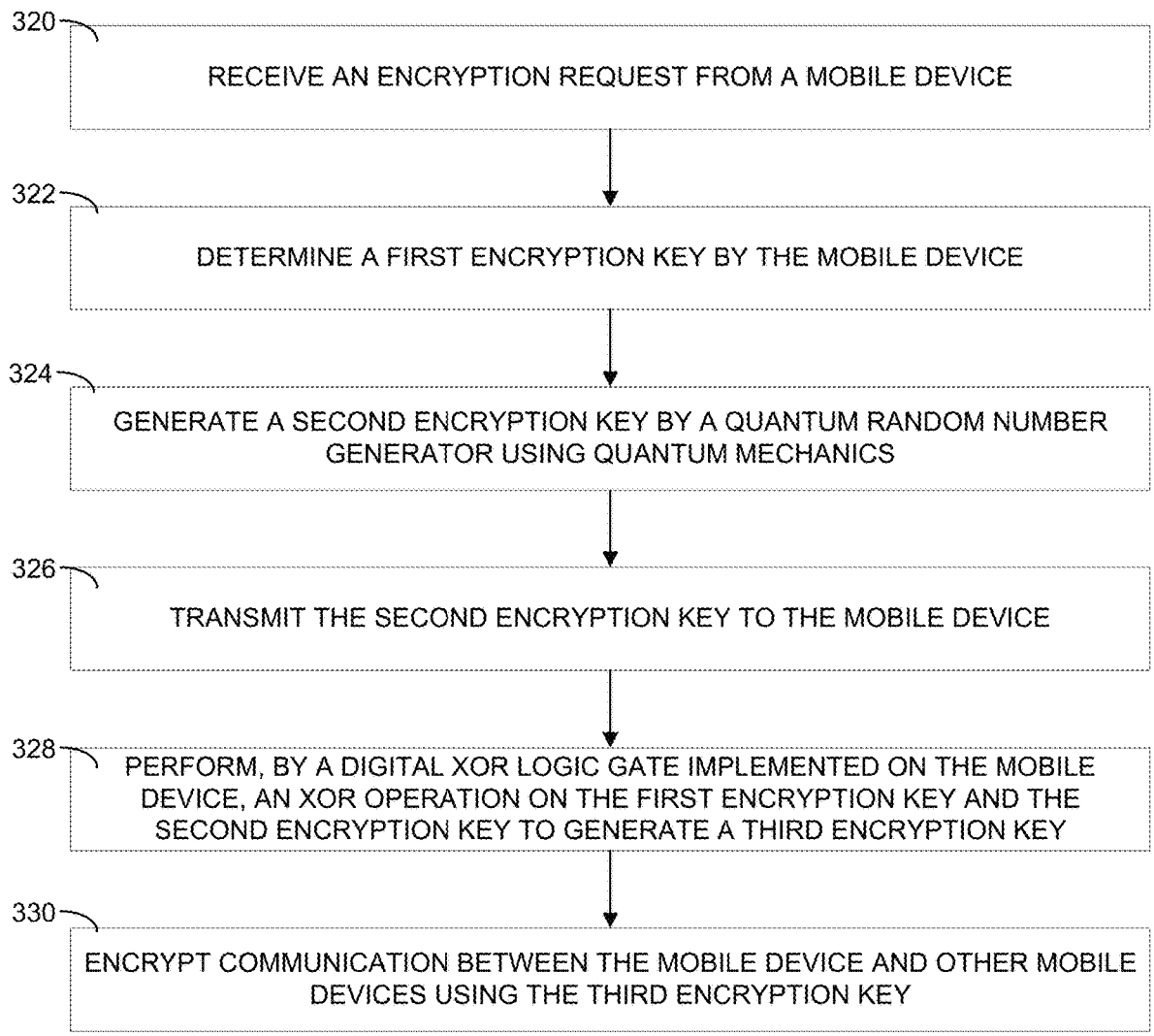
FIG. 3B illustrates a flow chart for encrypting communication according to one aspect of the disclosed technology.
Figure 3C:
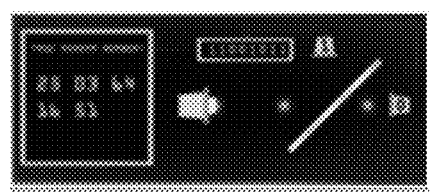
FIG. 3C illustrates how the photons are separated, unbiased, and how it shapes the output of the electronic signal.

FIG. 3B illustrates an example flow process for encrypting communication. At 320, the processor 104 of the quantum system 100 may receive an encryption request from the mobile device 150. At 322, the mobile device 150 may determine a first encryption key. At 324, the QRNG 102 may generate a second encryption key using quantum mechanics. At 326, the processor 104 transmits the second encryption key to the mobile device 150. At 328, a digital XOR logic gate implemented on the mobile device may perform an XOR operation on the first encryption key and the second encryption key to generate a third encryption key. At 330, the mobile device 150, such as the quantum voice app 152 may encrypt communication between the mobile device 150 and other mobile devices using the third encryption key.

Figure 4:
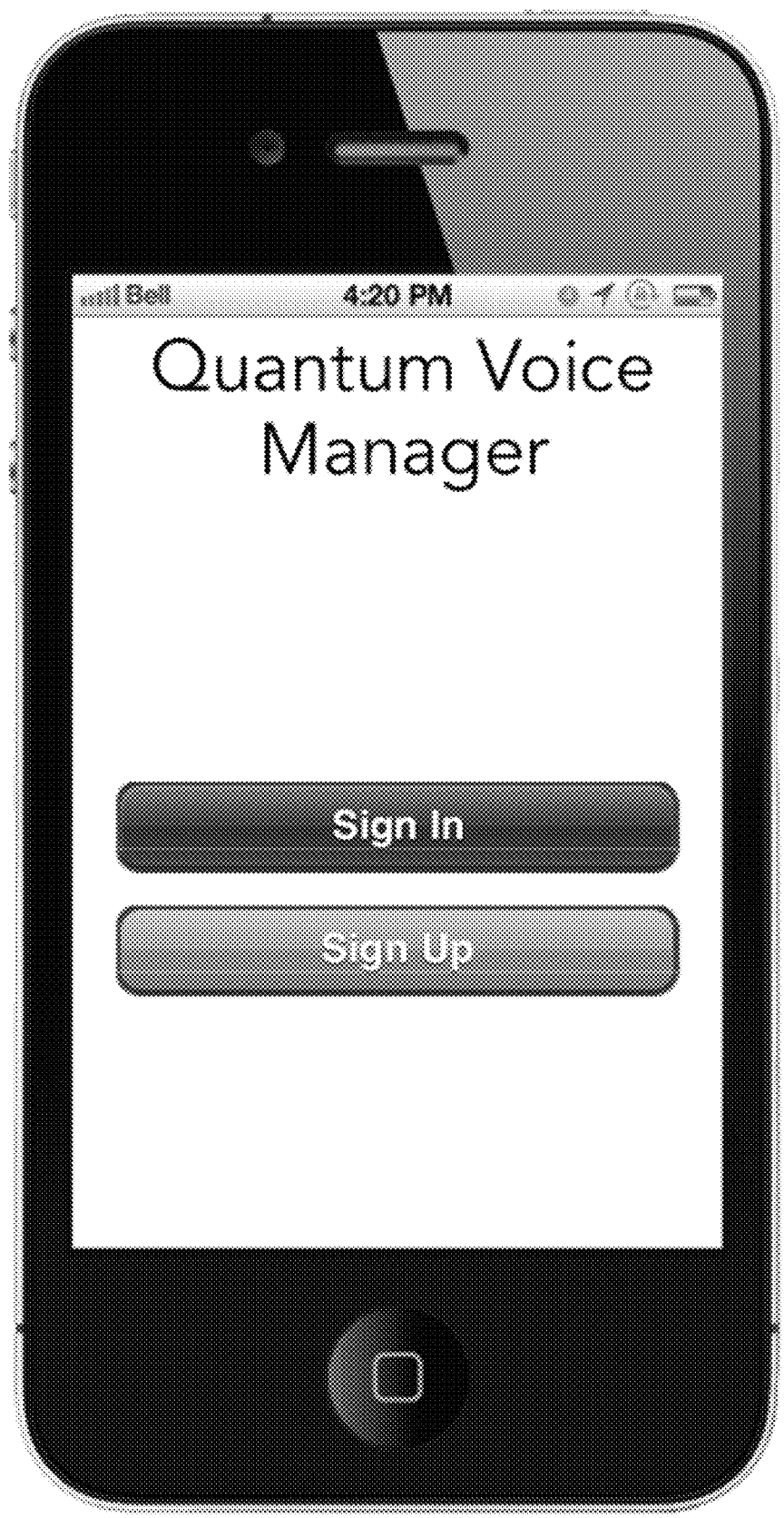
FIG. 4 illustrates an example sign-in and sign-up page of the quantum voice manager app according to one aspect of the disclosed technology.

FIG. 4 illustrates an example sign-in and sign-up page of the quantum voice manager app 154. The app 154 may be used by the administrator or the manager inside a company to manage users or customers. The administrator may decide who speaks to whom, such as which user or customer speaks to which user or customer.

Figure 5:
FIG. 5 illustrates an example sign-in page of the quantum voice manager app according to one aspect of the disclosed technology.
Figure 6A:
FIGS. 6A-6D illustrate example pages where the administrator may create a new customer account according to one aspect of the disclosed technology.
Figure 6B:
Figure 6C:
Figure 6D:
Figure 7:
FIG. 7 illustrates an example page where the administrator may add organizations and add users according to one aspect of the disclosed technology.
Figure 8:
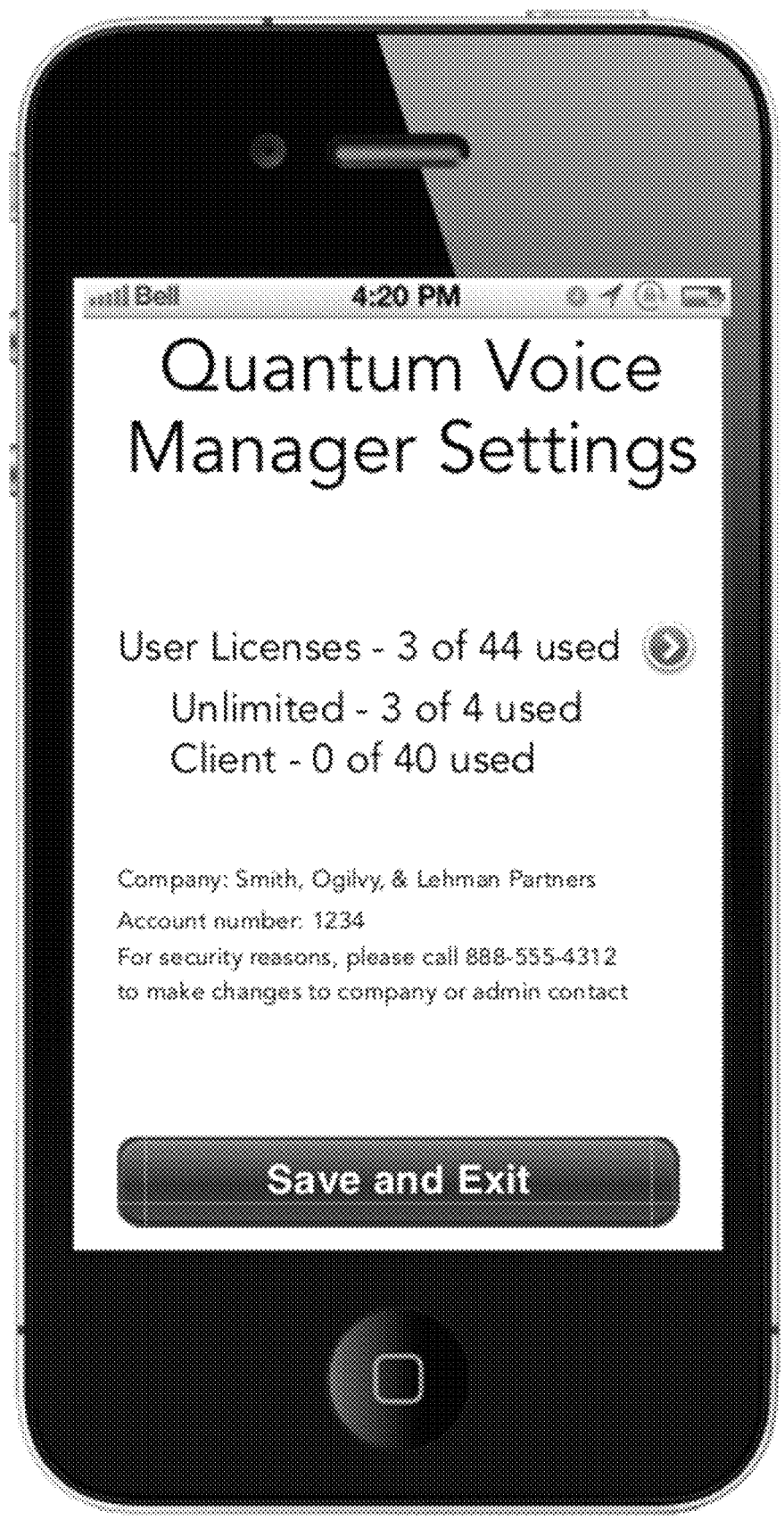
FIG. 8 illustrates an example licensing page according to one aspect of the disclosed technology.
Figure 9:
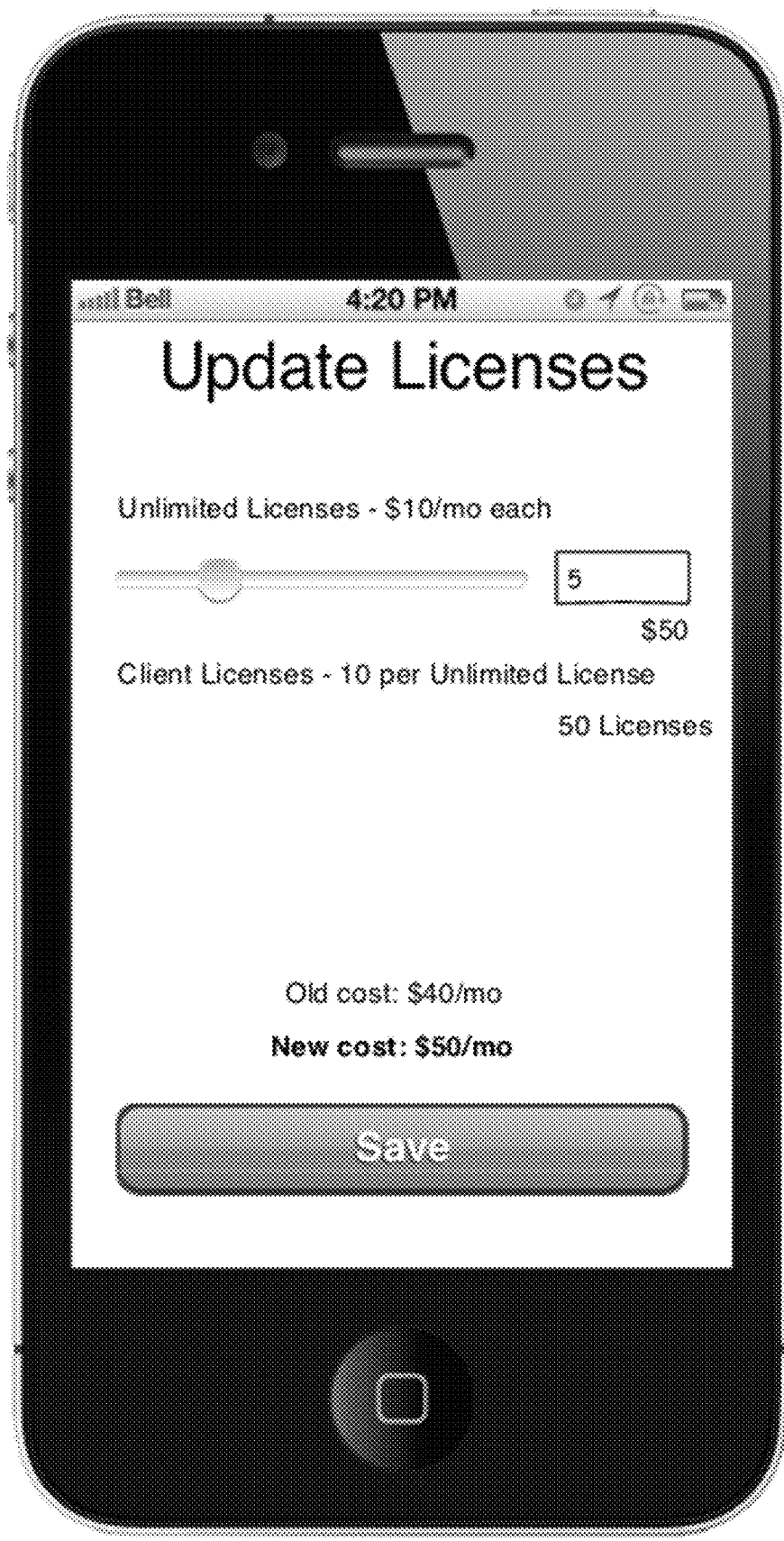
FIG. 9 illustrates an example page where the administrator may update licenses according to one aspect of the disclosed technology.

FIG. 5 illustrates an example sign-in page of the quantum voice manager app 154. FIGS. 6A-6D illustrate example pages where the administrator may create a new customer account. FIG. 7 illustrates an example page where the administrator can add organizations, and add users to each organization. FIG. 8 illustrates an example licensing page. Each license may allow usage by a predetermined number of users. Each license may have a fixed cost. Additional license fee may need to be paid in order to increase the number of users. The administrator may update licenses using the example page illustrated in FIG. 9.

Figure 10:
FIG. 10 illustrates an example page where the administrator may add organizations according to one aspect of the disclosed technology.
Figure 11:
FIG. 11 illustrates an example page where the administrator may edit organizations according to one aspect of the disclosed technology.
Figure 12:
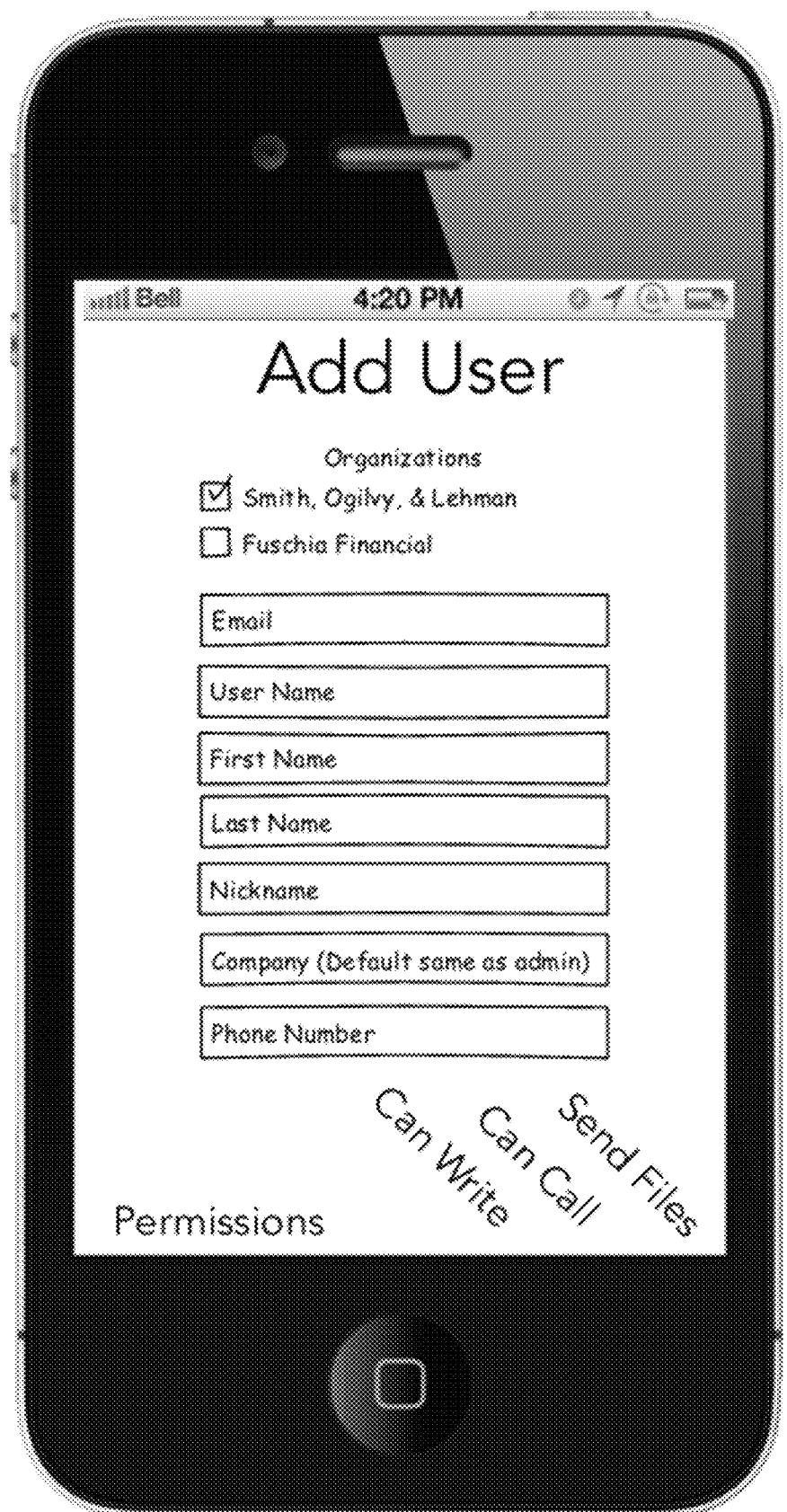
FIG. 12 illustrates an example page where the administrator may add users according to one aspect of the disclosed technology.
Figure 13:
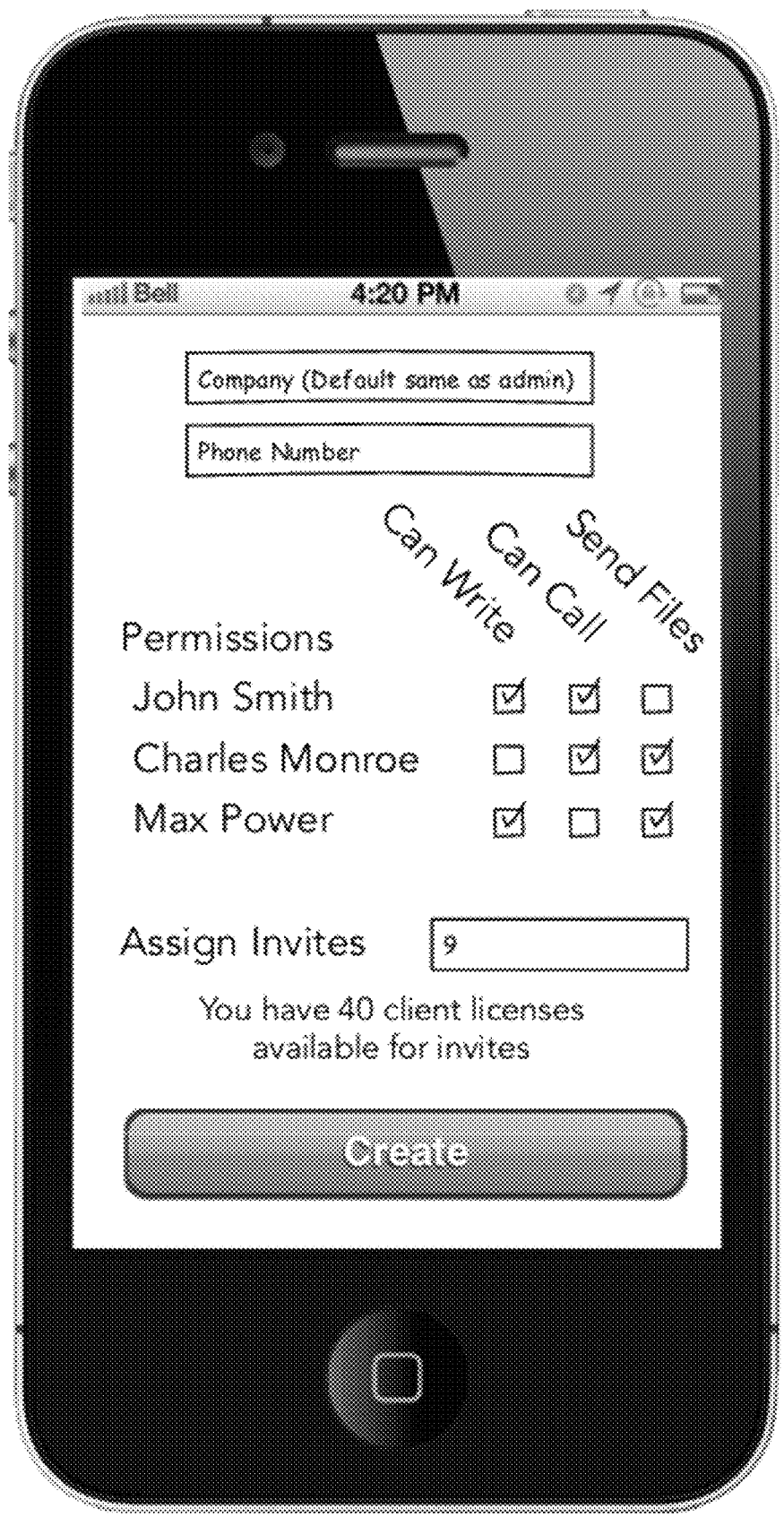
FIG. 13 illustrates an example page where the administrator may assign permission to the added user according to one aspect of the disclosed technology.

FIG. 10 illustrates an example page where the administrator can add organizations. FIG. 11 illustrates an example page where the administrator may edit organizations. FIG. 12 illustrates an example page where the administrator may add users. FIG. 13 illustrates an example page where the administrator may assign permission to the added user.

Figure 14:
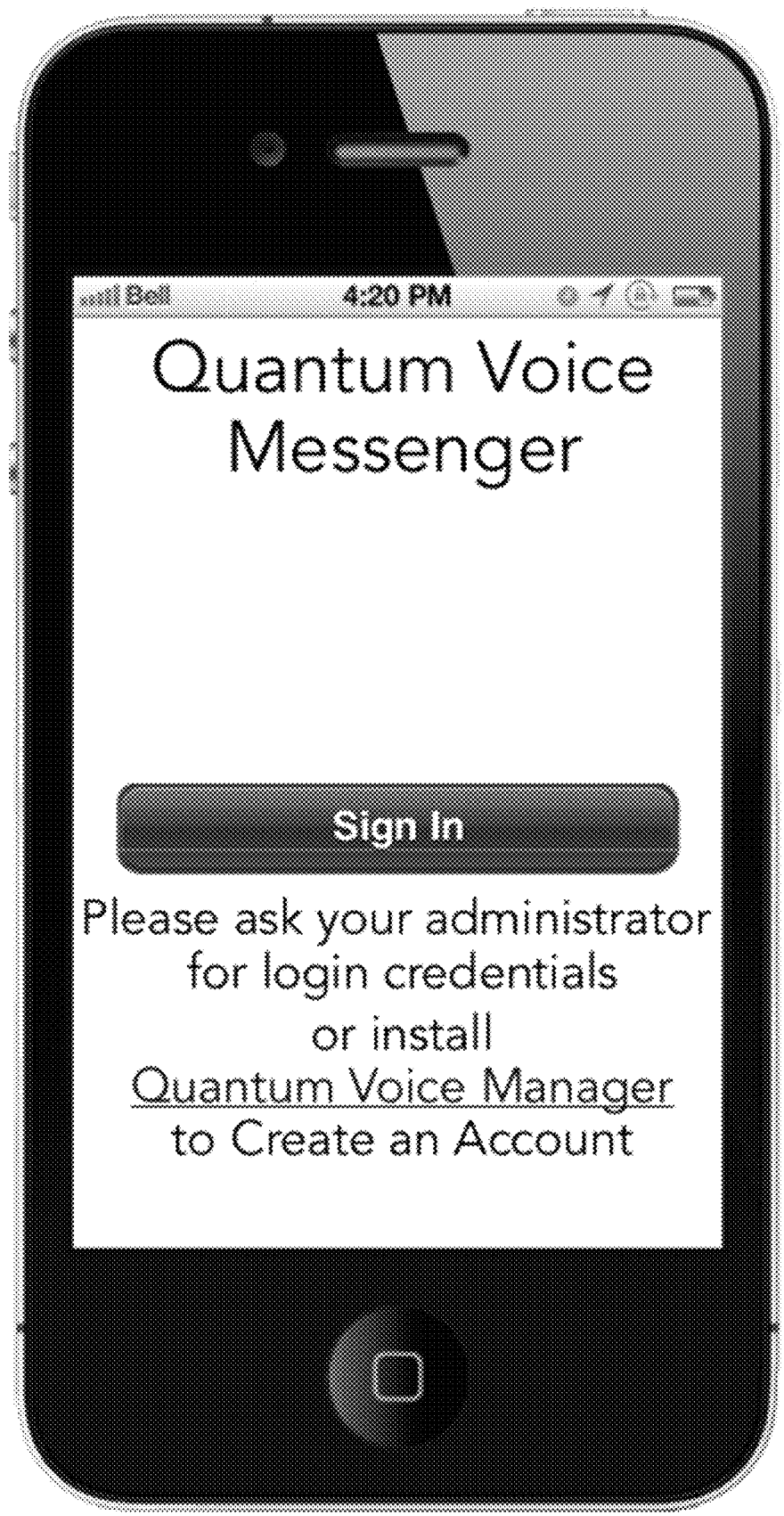
FIGS. 14-15 illustrate example sign-in pages of the quantum voice app according to one aspect of the disclosed technology.
Figure 15:

FIGS. 14-15 illustrates example sign-in pages of the quantum voice app 152 to be used by users. A user may be a customer of a particular company. The customer may be in the same company or organization as the administrator. The customer may also belong to a different company or organization.

Figure 16:
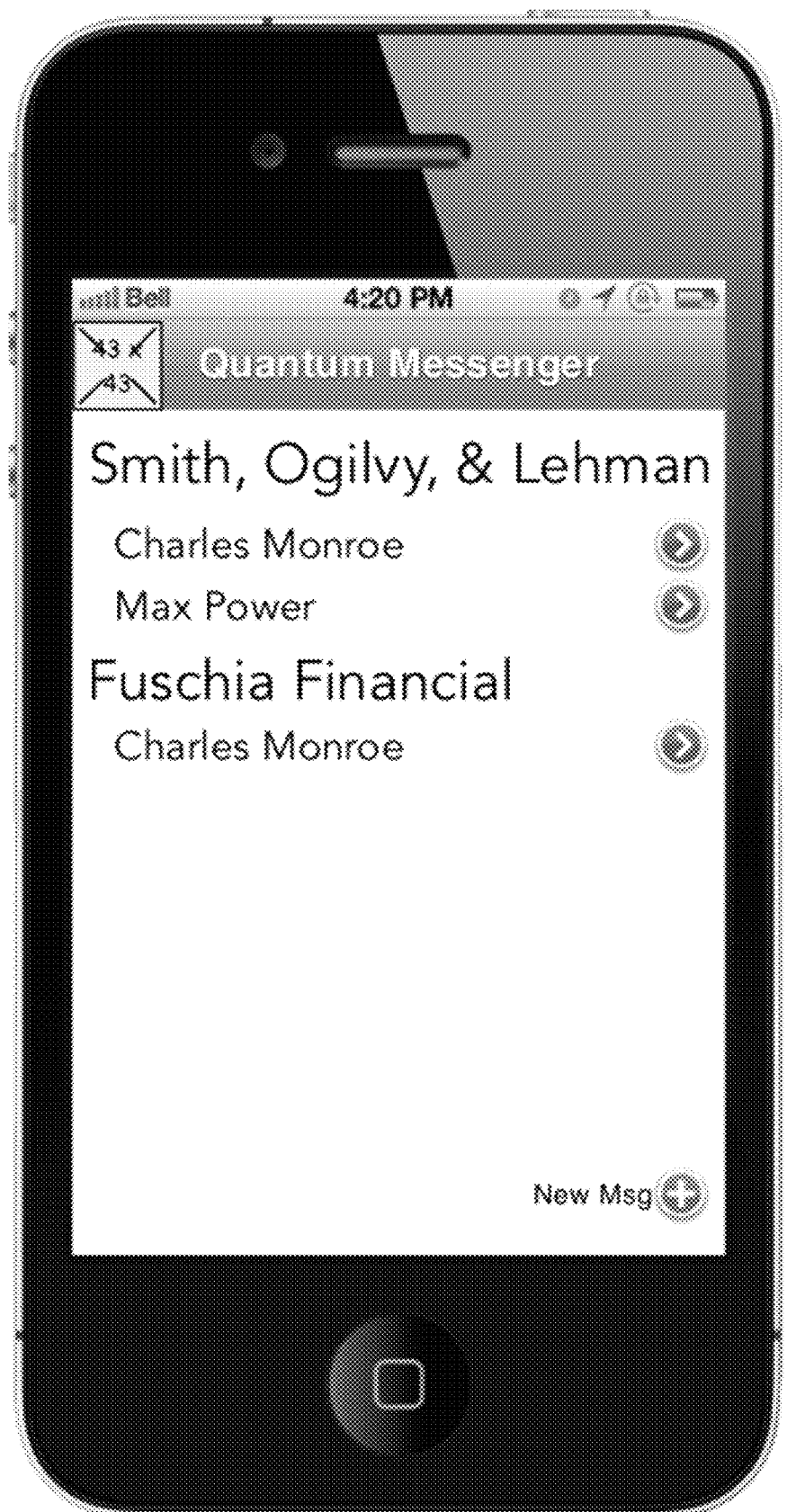
FIG. 16 illustrates an example page of the quantum voice app after the user signs in according to one aspect of the disclosed technology.

FIG. 16 illustrates an example page of the quantum voice app 152 after the user signs in. The messenger screen displays organizations and contacts at those organizations that the user can communicate with. As shown in FIG. 16, the user may communicate with contacts at two different organizations.

Figure 17:
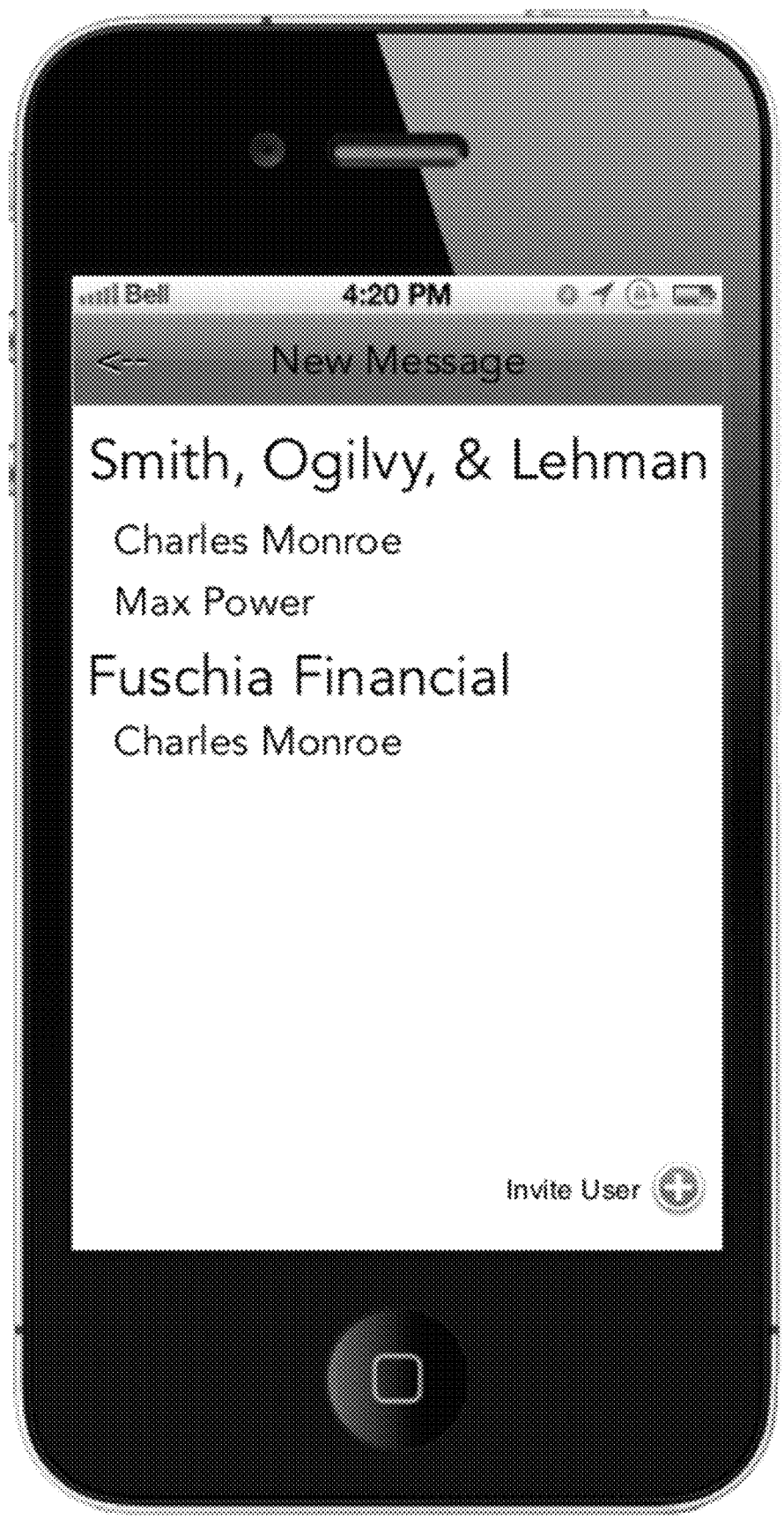
FIG. 17 illustrates a new message screen of the quantum voice app according to one aspect of the disclosed technology.
Figure 18:
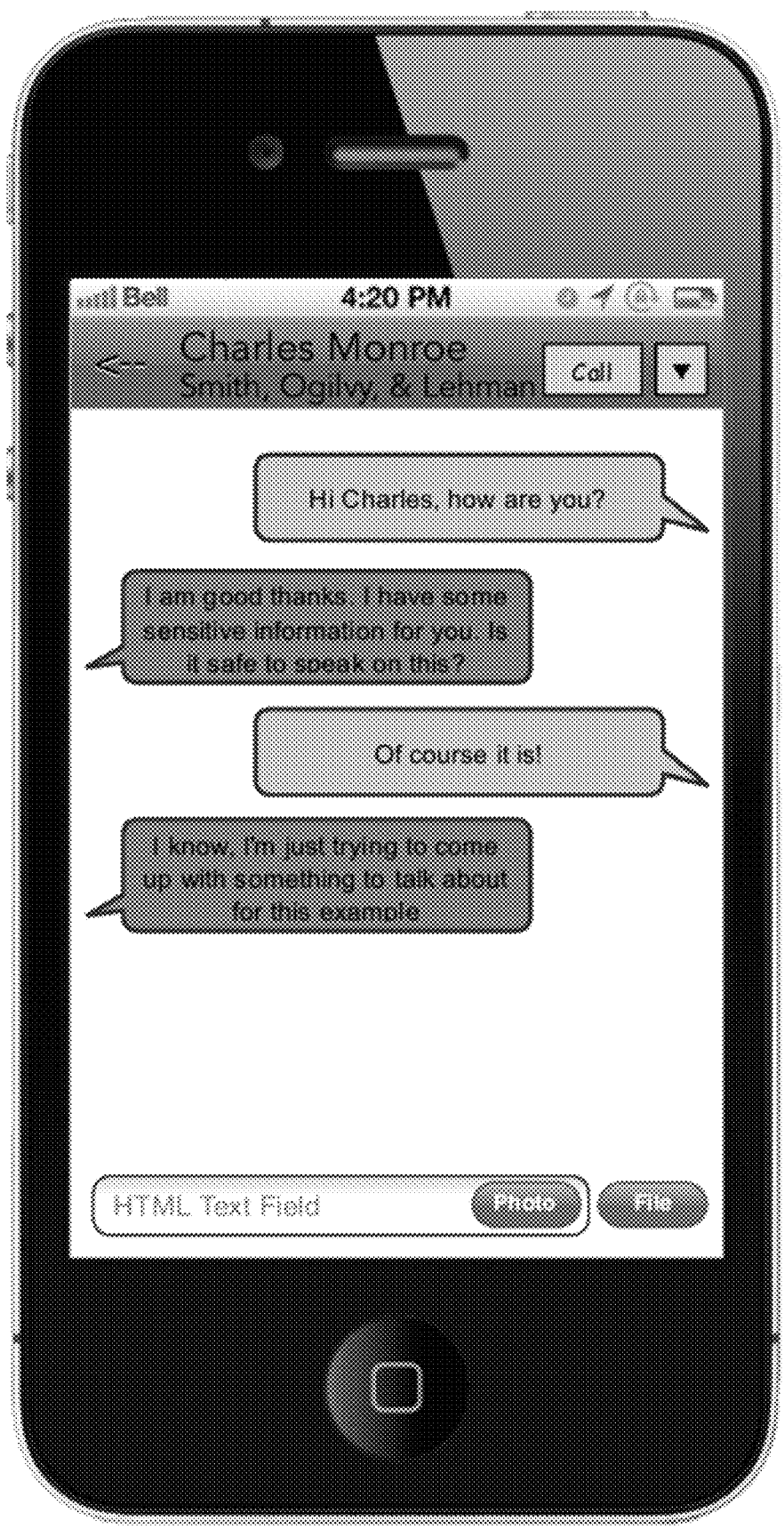
FIG. 18 illustrates an example message view of the quantum voice app according to one aspect of the disclosed technology.
Figure 19:
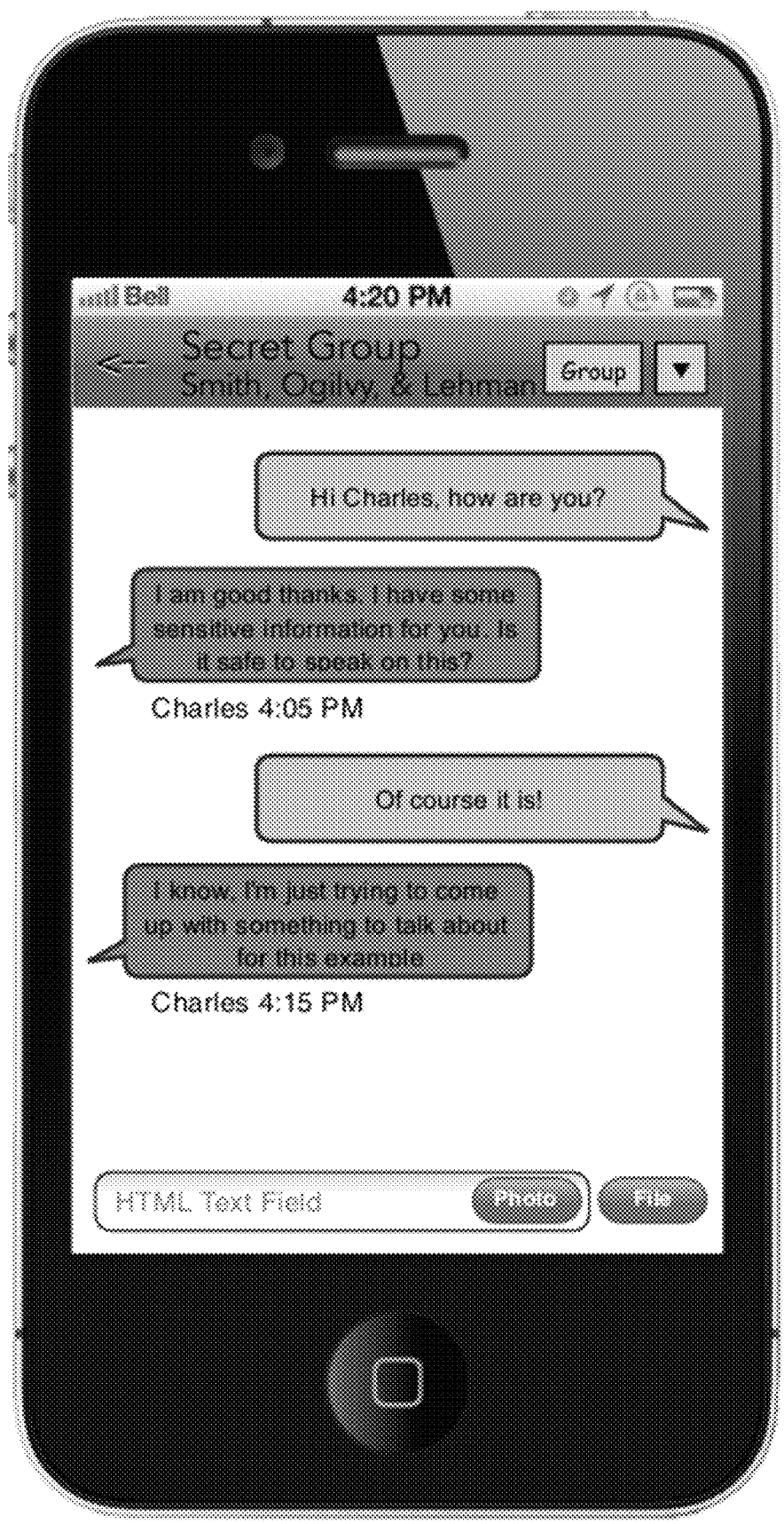
FIG. 19 illustrates an example group message view of the quantum voice app according to one aspect of the disclosed technology.

FIG. 17 illustrates a new message screen of the quantum voice app 152. FIG. 18 illustrates an example message view of the quantum voice app 152. FIG. 19 illustrates an example group message view of the quantum voice app 152.

Figure 20:
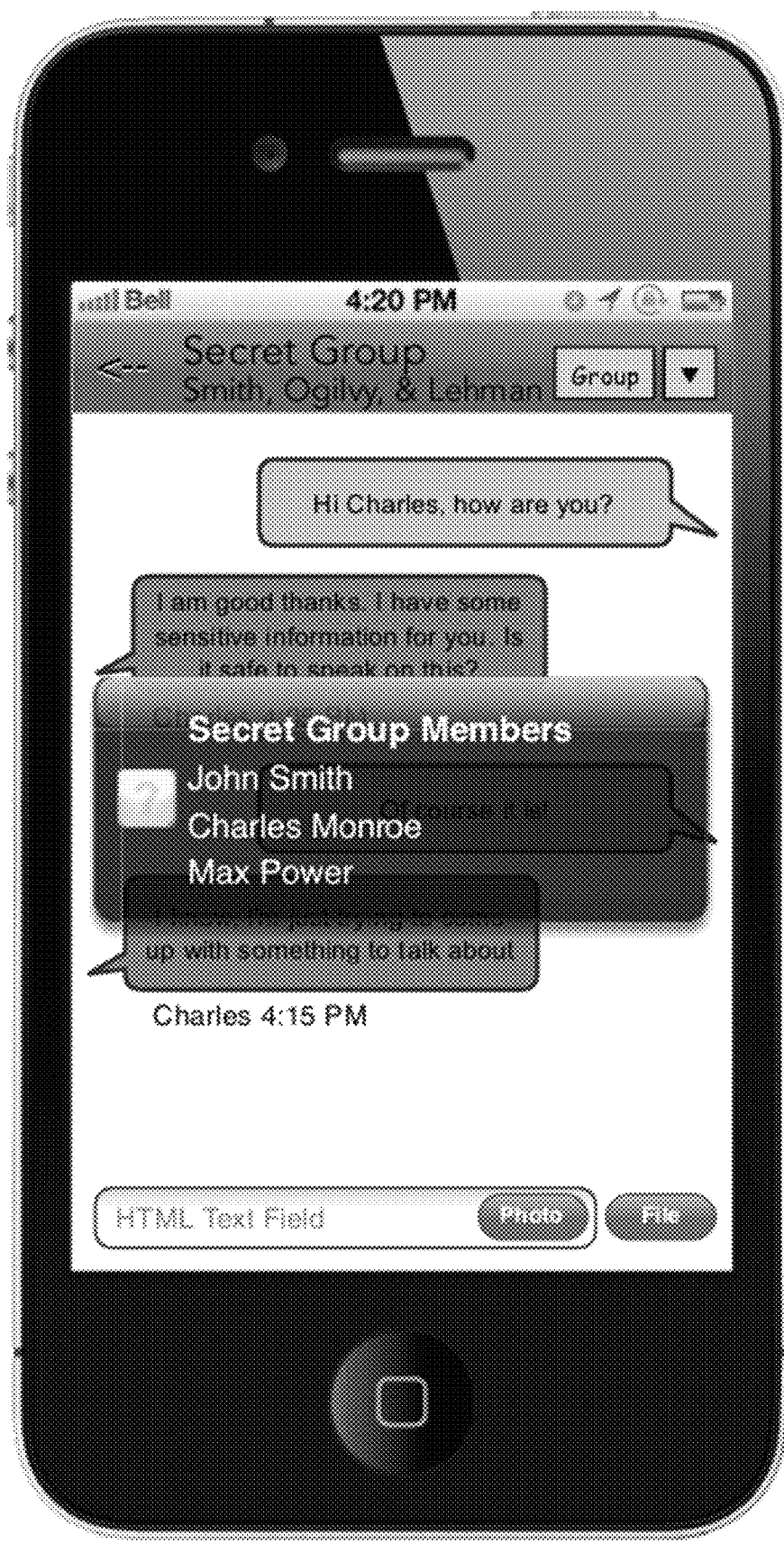
FIG. 20 illustrates an example group members popup window of the quantum voice app according to one aspect of the disclosed technology.
Figure 21:
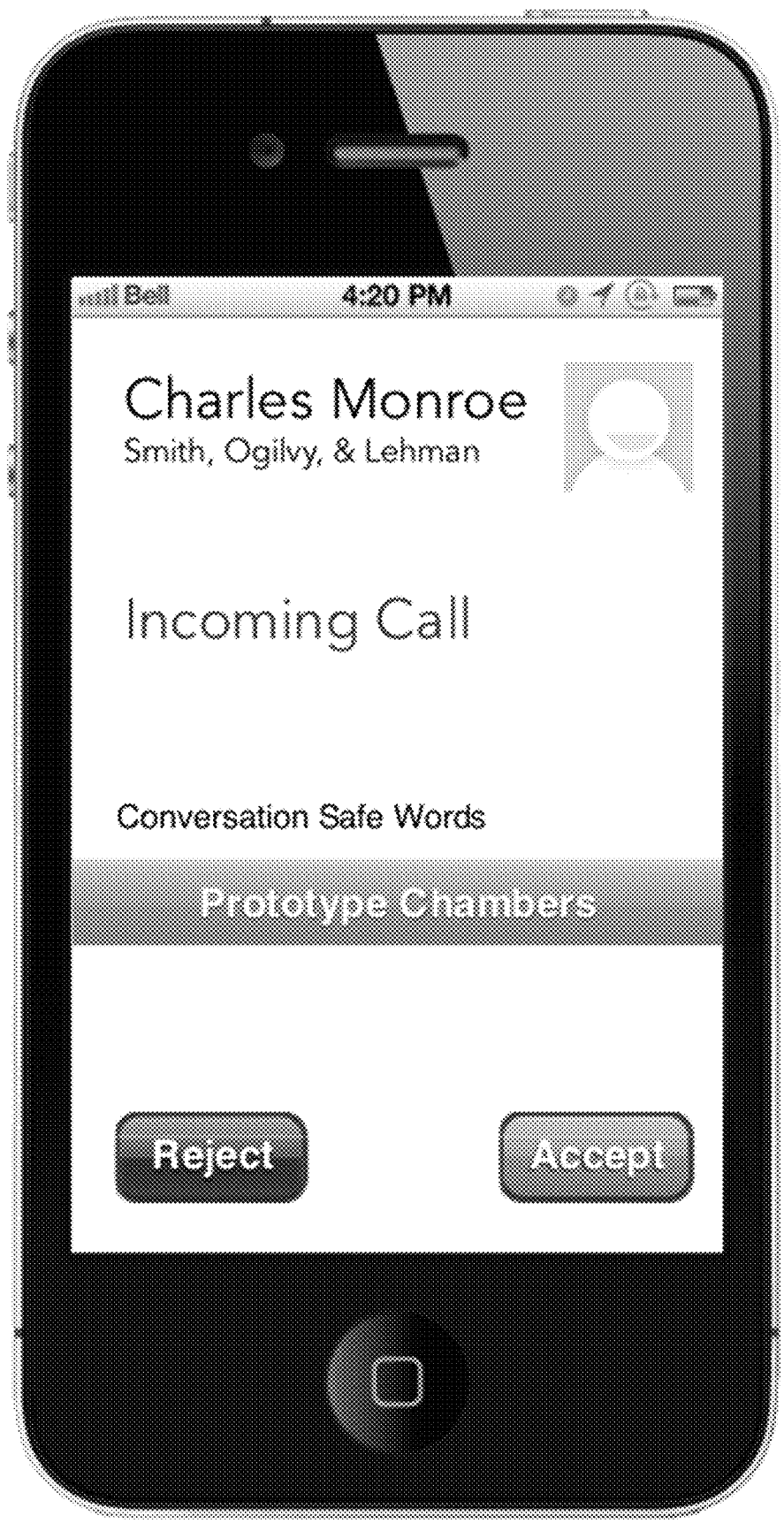
FIG. 21 illustrates an incoming call screen of the quantum voice app according to one aspect of the disclosed technology.
Figure 22:
FIG. 22 illustrates an outgoing call screen of the quantum voice app according to one aspect of the disclosed technology.
Figure 23:
FIG. 23 illustrates an active call screen of the quantum voice app according to one aspect of the disclosed technology.
Figure 24:
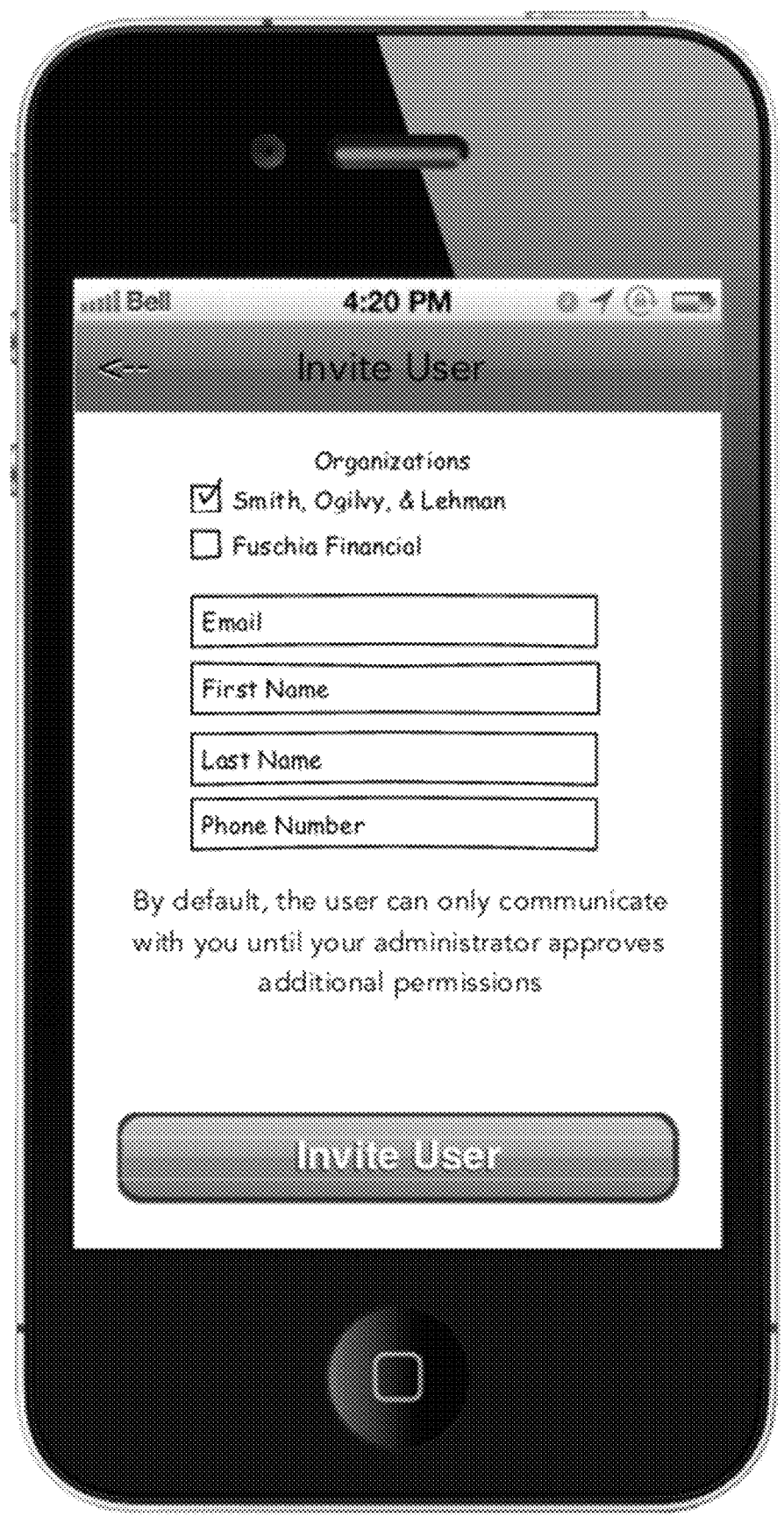
FIG. 24 illustrates an example screen to invite a user according to one aspect of the disclosed technology.
Figure 25:
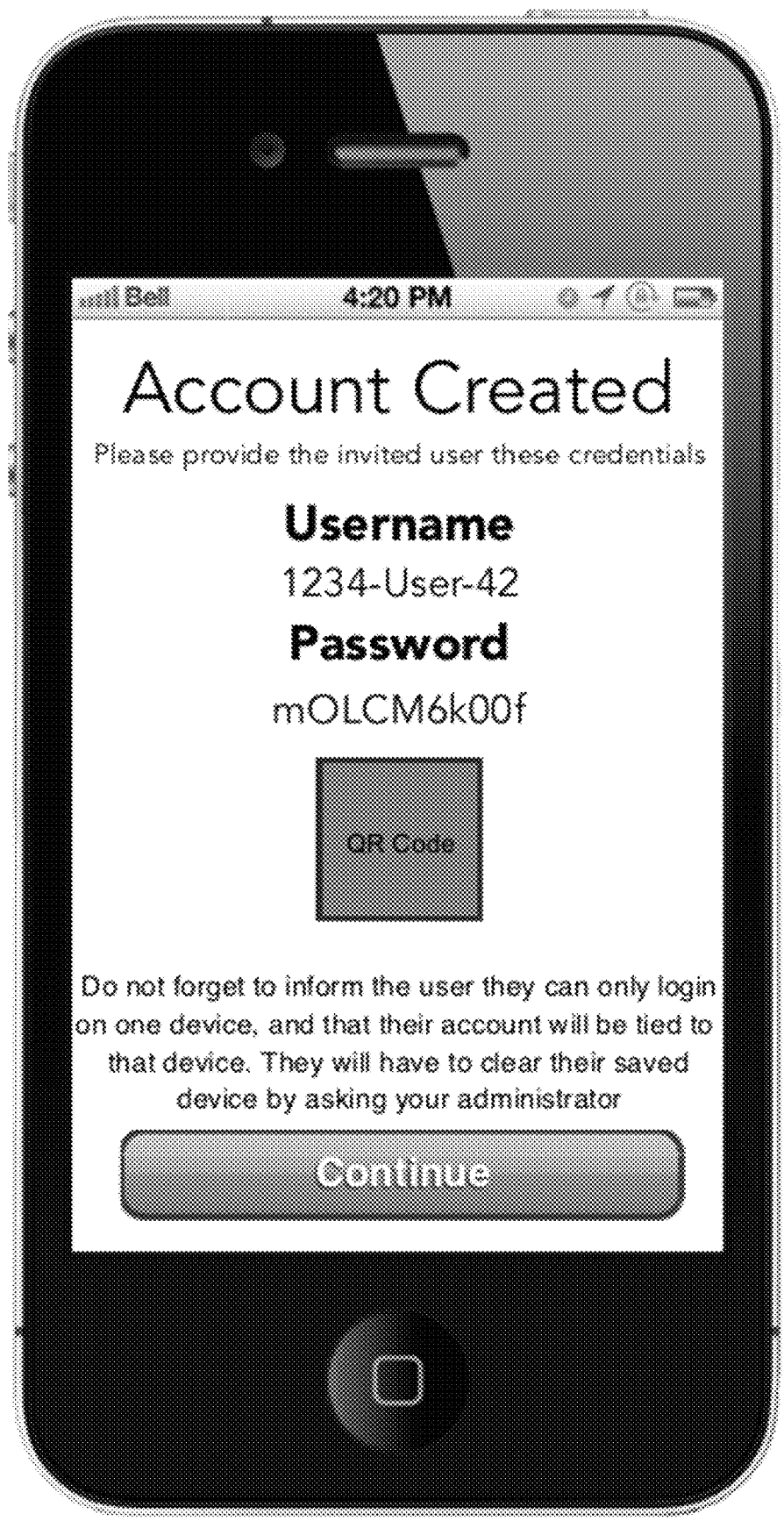
FIG. 25 illustrates an example screen of invitation confirmation according to one aspect of the disclosed technology.

FIG. 20 illustrates an example group members popup window of the quantum voice app 152. The user may create a secret group. FIG. 21 illustrates an incoming call screen of the quantum voice app 152. FIG. 22 illustrates an outgoing call screen of the quantum voice app 152. FIG. 23 illustrates an active call screen of the quantum voice app 152. FIG. 24 illustrates an example screen to invite a user. FIG. 25 illustrates an example screen of invitation confirmation.

Returning to FIG. 2, the quantum mail 118 may be a service that includes PGP and TOR ("The Onion Router"), built on top of an Exchange email server. The quantum mail 118 may leverage the Outlook email client's familiarity, focusing on security and encryption. Messages stored on the quantum system 100 may be encrypted to a PGP key only the client has. The quantum mail 118 provides credit card style fraud prevention to Exchange email.

The quantum mail 118 may be a plugin for outlook which automatically encrypt messages using Quantum on Demand Service (Quantum Entropy as a Service) to enhance entropy for encryption over HTTPS and in asymmetric key generation. Unlike PGP, which offers end-to-end encryption between all users, the quantum mail 118 may provide end-to-end encryption only when both users are Quantum Mail subscribers.

Quantum manager 120 may provide the Security Leader with the option of purchasing and managing quantum mail 118 for their organization.

The outlook add-in may initiate a TOR connection to communicate with the Exchange server. The Add-in may hold encrypted keys for the user, to which all emails are encrypted. The key may be decrypted using a simple password initially. Keys may be securely exchanged between the quantum voice app 152 and the quantum mail 118.

With continued reference to FIG. 2, the firewall 106 may prevent malicious attacks from passing through to a routing server.

The load balancing server 108 may route the connection to either the master server 110 or the failover server 112. The load balancing server 108 may store quantum scripts including monitor script, load balancing script, internal status script which may check server health, and external status script which may check server health after validation.

All write requests pass through the master server 110 by default. The master server 110 may manage user databases and validate communications before passing them back to the user. The master server 110 may also pass write data to the failover server 112 once validated, in the event the master server 110 becomes unresponsive. The master server 110 may be also capable of providing read requests. The master server 110 may include quantum scripts, such as master script, and external status script which may check server health after validation.

The failover server 112 may read queries routed through the failover server 112. In the event that the master server 110 stops responding, the load balancing server 108 may route write requests to here. The failover server 112 may include quantum scripts, such as failover script, and external status script which checks server health after validation.

The backup server 114 may hold periodic backups from both local and other stacks. The backup server 114 may include quantum scripts, such as backup script, and external status script which may check server health after validation.

The non-transitory computer readable medium 116 may store a database with four tables to manage corporate accounts, users, organizations, and permissions. The database may include the following tables: accounts, users, organizations and permissions.

For the accounts table, paid monthly accounts may be required to access the quantum system 100 and manage users, organizations, or set permissions. Accounts may be purchased through the quantum manager app. The accounts table may store information such as ID, status (paid until date), payment token, paid user licenses (#), client license override (# or %), email, username, password+salt hash, salt, security public key, first name, last name, nickname, company, address 1, address 2, city, state, zip, country, mobile phone number, last sign in date/time, and device MAC address.

For the users table, individual users may need to be set up with a key for first time use. This key may allow them to activate their app and synchronize all settings and permissions from the quantum system 100. The users table may include ID, first-access key, status, owner account ID, organization assigned ID, email, username, password+salt hash, salt, security public key, first name, last name, nickname, company, address 1, address 2, city, state, zip, country, mobile phone number, client invites available (#), last sign in date/time, and device MAC address, The organizations table may store information of the closed group of users. An administrator may need an active paid account to create or manage an organization, in which they can create users and set permissions for how organization members can interact. The organizations table may include ID, status, owner account ID, organization name, and organization description.

The permissions table may store information for the final validation before a message is queued for delivery. The permission table may include one or more of the following: ID, status, account ID, origin user ID, destination user ID, permit text, permit voice, and permit file transfer.

The quantum scripts may be a collection of custom developed code which works to provide a seamless backend to Signal for users. The code may be used to route and handle requests most efficiently, mitigate downtime on one or several servers, synchronize with other stacks, and monitor all aspects for anomalies. Scripts may be used for one or more components of the quantum system 100, denoted in each script.

The collection of scripts which provide the backend functionality may include: monitor script, load balancing script, master script, failover script and backup script.

The monitor script may reside on the load balancing server 108. The monitor script may run persistently. This monitor script may make requests to all servers to monitor their performance and detect and report issues before they become problematic. The monitor script may monitor the firewall 106 for suspicious activity. The monitor script may monitor system health, load, device usage and other information on the master server 110, the failover server 112, the load balancing server 108, and the backup server 114. The monitor script may run regular tests on the QRNG 102.

The monitor script may perform the following actions. The monitor script may check the load balancing server 108, such as running internal script, locked to localhost, and processing results. For example, if any issues reported, the monitor script may send email report to the administrator.

The monitor script may check the master server 110, such as sending authenticated status request to the master server 110. The monitor script may process results. For example, if any issues, the monitor script may send email report to the administrator, including sending authenticated status request to the failover server 112. If any issues reported, the monitor script may send email report to the administrator, such as sending authenticated status request to the failover server 112. If any issues reported, the monitor script may send email to the administrator and shut down services. Otherwise, the monitor script may tack process to route data to the failover server 112. If no issues are reported, the monitor script may write requests to route to the failover server 112. The monitor script may also generate and set new keys for next authentication.

The monitor script may check the failover server 112. The monitor script may send authenticated status request to the failover server 112. The monitor script may process results. If any issues, the monitor script may send email report to the administrator. The monitor script may send authenticated status request to the master server 110. If any issues reported, the monitor script may send email report to the administrator. The monitor script may send authenticated status request to the failover server 112. If any issues reported, the monitor script may send email to the administrator and shut down services. Otherwise, the monitor script may stack process to route data to the failover server 112. If no issues are reported, the monitor script may read requests to route to the master server 110. The monitor script may generate and set new keys for next authentication.

The monitor script may check the backup server 114. The monitor script may send authenticated request to the backup server 114. The monitor script may process results. If any issues, the monitor script may send email report to the administrator.

The load balancing script may reside on the load balancing server 108. The load balance script may run when triggered. This script may use data from the monitor script to route requests through the system. For example, the master server 110 is meant to handle all write requests (e.g. sending a message). If the master server 110 is offline, the load balancing script may reroute the request to the failover server 112 so no downtime is experienced on the user level.

The load balancing script may route request. On new request, the load balancing script may check most recent results from the monitor script and route request accordingly.

The master script may reside on the master server 110. The master script may run when triggered. This script may authenticate and validate all write requests, and synchronize with the failover server 112. The script may be also capable of handling read requests, if routed by the load balancing script. For example, a user may like to send a message to another user. The message may be encrypted and sent to the master server 110, which authenticates the user and validates the user has permission to send this message to the recipient. Once approved, it may queue the for receipt in the Signal Backend and pushes the message to the database in the failover server 112.

The master script may process account registration. The master script may validate request preform validation (e.g. email validation, phone number validation, address validation, etc.) and ensure account does not already exist for email address. The master script may validate payment. The master script may exchange keys with app. The master script may add to accounts table, including status (paid until date), licensed users (#), payment token, email, username, password with salt hash, salt, security public key, first name, last name, nickname, company, address 1, address 2, city, state, zip, country, and mobile phone number. The master script may send welcome email.

The master script may process payment. The master script may check status (paid until date). If active date has passed, the master script may attempt to charge token (rate multiplied by licensed users). If charge successful, the master script may update status (paid until date) to next due date. Otherwise, the master script may send email notifying user of non-collected payment. If third day since Status (paid until date), the master script may mark account and users as suspend.

The master script may process license update. The master script may validate app user. The master script may check status (paid until date). The master script may calculate pro-rated subscription difference using the formula provided below:

((days remaining until Status(paid until date)/billing cycle days)*(New Licensed users−Old Licensed users)*rate).

The master script may attempt to charge/refund the token. If successful charge, the master script may update licensed users (#) to new number, send confirmation email, and report success to app. If unsuccessful charge, the master script may report failure reason to app. The master script may send email to internal payments email with report.

The master script may process new user. The master script may validate app user—administrator or user with invite. The master script may check status (paid until date). The master script may check licensed users (#) and compare to active users linked to account (Eg. SELECT COUNT (*) FROM 'Users' WHERE 'Owner Account ID'=Accounts→ID AND Status'='Active'). If the number of licensed users is greater than the number of active users, the master script may add user to accounts table, add permissions to permissions table, send confirmation email, and report success to app. If the number of licensed users is not greater than the number of active users, the master script may report failure reason to app (e.g. "Not enough Licensed Users, please check active users or add users to your License").

The master script may process update user. The master script may validate app user. The master script may check status (paid until date). The master script may check user is active. If active, the master script may validate changes and apply to permissions table. If not active, the master script may report error to app.

The master script may process remove user. The master script may validate app user, and may set user to inactive.

The master script may process sign in—account (administrator). The master script may validate app user. The master script may check if account is current. The master script may check if MAC address is set. If MAC address is set, the master script may compare MAC address set to one submitted by app. If same, the master script may process login. If not same, the master script may give error saying that the account is tied to another device, and if device has changed, the administrator needs to log out of their other device first. If the user has lost the other device, this needs to be reported to the quantum system 110 immediately. If MAC address is not set, the master script may add MAC address to the accounts table.

The master script may process sign out—account (administrator). The master script may validate app user. The master script may delete public key on device and accounts table.

The master script may process Sign In—User. The master script may validate app user. The master script may check if owner account is current. The master script may check if MAC address is set in Users table. If MAC address is set in users table, the master script may compare MAC address set to one submitted by app. If same, the master script may process login. Otherwise, the master script may give error saying that the account is tied to another device, and if device has changed, the user may need to report this to the administrator to make the change. If MAC address is not set in Users table, the master script may add MAC address to Users table.

The master script may process sign out—user. The master script may validate app user. The master script may delete public key on device and users table.

The master script may process send message. The master script may validate app user. The master script may check if account is current. If the account is current, the master script may check permissions. If permissions allow, the master script may send to Signal backend. Otherwise, the master script may report permissions not sufficient to user. If account is not current, the master script may report error to app.

The master script may process send file. The master script may validate app user. The master script may check if account is current. If account is current, the master script may check permissions. If permissions allow, the master script may send to Signal backend. Otherwise, the master script may report permissions not sufficient to user. If account is not current, the master script may report error to app.

The master script may process start call. The master script may validate app user. The master script may check if account is current. If account is current, the master script may check permissions. If permissions allow, the master script may send to Signal backend. Otherwise, the master script may report permissions not sufficient to user. If account is not current, the master script may report error to app.

The master script may process account termination. The master script may validate app user, check if account is current, set all users on account to inactive, and set account status to inactive.

The failover script may reside on the failover server 112. The failover script may run when triggered. This script may authenticate read requests, and synchronize with the master server 110. The script may be also capable of handling write requests, if routed by the load balancing script. For example, each connected devices may check in periodically for new messages. A request to read an inbox may be first validated, then the script may check for new messages. If there is a new message available, the failover server 112 may provide this message to the user and erases it from the queue and pushes the deletion on to the master server 110.

The failover script may read sync permissions. The failover script may validate app user, check account is current, and send request to Signal backend.

The failover script may read message. The failover script may validate app user, check account is current, and send request to Signal backend.

The failover script may read file. The failover script may validate app user, check account is current, and send request to Signal backend.

The failover script may read call routing. The failover script may validate app user, check account is current, and send request to Signal backend.

The backup script may reside on the master server 110 and the failover server 112. The backup script may run hourly. The backup scripts may run at a staggered rate, the master running on the hour and the backup running on the half of the hour. Backups may be pushed via SFTP (secure file transfer protocol) to the backup server 114.

The backup script may run master backup. The backup script may run failover backup. The backup script may run load balancing backup. The backup script may run remote backup, including backup remote master, backup remote failover, and backup remote load balancing.

To prevent unwanted intrusions, the quantum voice app 152 may require all users to be on the most recent version of iOS and have all their apps up to date before to view or respond to messages. The quantum system 100 may maintain a proprietary database of the current version of all apps which are whitelisted and the current iOS version for each model of iPhone. The quantum system 100 may run hourly checks on Apple's App Store pages to scrape the version number of whitelisted apps.

Whenever a new version is released, the quantum system 100 may know within the hour and provide this to each device in the organization as a JSON document, based on their Organization Whitelist. If there is any discrepancy, depending on the organization's security leader, users may either be warned they are using potentially vulnerable apps or be blocked from viewing or replying to messages until they have updated all their apps.

The quantum voice app 152 may check the iOS version and build against the current version using the Raw Keys/Values. The quantum voice app 152 may use Android's ability to grant more privileges, such as usage access. The usage access feature may share app information with the quantum voice app 152, ensuring every app on the mobile device 150 is up to date. The app version database may be downloaded to the quantum voice app 152 each time.

To further prevent users from accidentally using apps that undermine the security of the organization on their device, the quantum voice app 152 may integrate a software whitelist managed by the Corporate Security Leader. Any app in the App Store may be added to the whitelist. When the whitelist feature is active, users may not be able to use quantum voice app 152 if any apps on their phone which is not on their organization's whitelist.

Each app has a unique ID. For example, the quantum voice app 152 has the App ID of "id1458479216". When this app is added by the Corporate Security Leader, users within the organization will be able to use the quantum voice app 152 with the other app installed.

Uber has the App ID of "id368677368". If a Corporate Security Leader approves this app, they can add the App ID in the admin area of the quantum voice app.

A licensed user may install a quantum hardware doctor software on its desktop or laptop to detect intrusion. The user may then connect its mobile device via USB and may be able to run an analysis to detect if the kernel has been tampered. The hardware doctor software may check the mobile device 150 by booting in as if to back it up and then again as if to jailbreak it. This process may not change any data or settings on the mobile device 150 but only verifies software integrity and response times.

The quantum hardware doctor software may validate that all components are authentic on the mobile device 150 by: analyzing backup files, verifying checksums of all software packages, and measuring the response for each query.

The externally performed backup may detect any software intrusions which may not be visible from inside the device itself. These sophisticated viruses may trick the devices analysis by returning the expected values. Still, ultimately the software needs to be stored somewhere between boots, and a backup would allow the quantum hardware doctor software to expose any virus residing in the file system.

The checksums of all files in the backup, including operating system files, may be verified to ensure that they are authentic from the developer and have not been tampered. That may expose the smallest code change as a very noticeable unique hash value. This may provide the additional benefit of making sure each app is at the correct version and has the correct code for that version.

The response times of each query made to the device may be recorded and compared to the typical query response time. It may be almost impossible, even to the most well-crafted espionage hardware, to send the expected responses to all the queries via USB while simultaneously matching the timing of a standard response. New code may take additional compute cycles, so it may make engineering equipment which could pass such a check extremely difficult. Humans are not able to notice several millisecond delays in a process, but the quantum hardware doctor may identify these types of unusual discrepancies. That helps avoid one of the worst kinds of hacking, which is to continue to use the affected device without knowledge of the hack.

Returning to FIG. 2, processes and methods disclosed herein may be processed by the processor 104 of the quantum system 100. The processor 104 may include one or more of a microprocessor, microcontroller, digital signal processor, co-processor or the like or combinations thereof capable of executing stored instructions and operating upon stored data. The processor 104 may be one or more known processing devices, such as a microprocessor from the Pentium™ family manufactured by Intel™ or the Turion™ family manufactured by AMD™. The processor 104 may constitute a single core or multiple core processor that executes parallel processes simultaneously. For example, the processor 104 may be a single core processor that is configured with virtual processing technologies. In certain embodiments, the processor 104 may use logical processors to simultaneously execute and control multiple processes. The processor 104 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

The non-transitory computer readable medium 116 may contain an operating system ("OS") and a program. The non-transitory computer readable medium 116 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein are implemented as a combination of executable instructions and data within the non-transitory computer readable medium 116. The non-transitory computer readable medium 116 may include one or more memory devices that store data and instructions used to perform one or more features of the disclosed embodiments. The non-transitory computer readable medium 116 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. The non-transitory computer readable medium 116 may include software components that, when executed by the processor 104, perform one or more processes consistent with the disclosed embodiments. In some embodiments, the non-transitory computer readable medium 116 may include a database to perform one or more of the processes and functionalities associated with the disclosed embodiments. The non-transitory computer readable medium 116 may include one or more programs to perform one or more functions of the disclosed embodiments.

The network 120 may include a network of interconnected computing devices more commonly referred to as the internet. The network 120 may be of any suitable type, including individual connections via the internet such as cellular or WiFi networks. In some embodiments, the network 150 may connect terminals, services, and mobile devices using direct connections such as radio-frequency identification (RFID), near-field communication (NFC), Bluetooth™, low-energy Bluetooth™ (BLE), WiFi™, Zig-Bee™, ambient backscatter communications (ABC) protocols, USB, WAN, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security. The network 120 may comprise any type of computer networking arrangement used to exchange data. For example, the network 120 may be the Internet, a private data network, virtual private network using a public network, and/or other suitable connection(s). The network 120 may also include a public switched telephone network ("PSTN") and/or a wireless network. The network 120 may also include local network that comprises any type of computer networking arrangement used to exchange data in a localized area, such as WiFi, Bluetooth™ Ethernet, and other suitable network connections that enable the quantum system 100 and the mobile device 150 to interact with one another.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

Certain implementations of the disclosed technology are described above with reference to block and flow diagrams of systems and methods and/or computer program products according to example implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some implementations of the disclosed technology.

These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

Implementations of the disclosed technology may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A quantum communication system for encrypting communication, comprising:
   a hardware processor configured to:
      receive an encryption request from a mobile device, wherein the mobile device determines a first encryption key; and
   a quantum random number generator configured to generate a second encryption key using quantum mechanics;
   wherein the hardware processor transmits the second encryption key to the mobile device relying entirely on a classical secure HTTP encrypted by a classical key rather than a quantum key and without relying on a quantum channel for key distribution;
   wherein the mobile device implements a digital XOR logic gate configured to perform an XOR operation on the first encryption key and the second encryption key to generate a third encryption key; and
   wherein the mobile device includes a quantum voice app that implements the digital XOR logic gate to generate the third encryption key and encrypts communication with other mobile devices using the third encryption key.

2. The quantum communication system of claim 1, wherein the third encryption key encrypts data communication including one or more of the following: voice, message, file sharing, mail, and VPN.

3. The quantum communication system of claim 1, wherein the first encryption key is generated by on-board security in the mobile device.

4. The quantum communication system of claim 1, wherein the hardware processor verifies credentials of a user of the mobile device, wherein the credentials include phone number and email address.

5. The quantum communication system of claim 1, wherein the quantum voice app synchronizes the third encryption key with other users of the quantum voice app.

6. A method for encrypting communication, comprising:
receiving an encryption request from a mobile device;
determining a first encryption key by the mobile device;
generating a second encryption key by a quantum random number generator using quantum mechanics;
transmitting the second encryption key to the mobile device relying entirely on a classical secure HTTP encrypted by a classical key rather than a quantum key and without relying on a quantum channel for key distribution;
performing, by a digital XOR logic gate implemented on the mobile device, an XOR operation on the first encryption key and the second encryption key to generate a third encryption key;
encrypting a communication between the mobile device and other mobile devices using the third encryption key; and
wherein the mobile device includes a quantum voice app that implements the digital XOR logic gate to generate the third encryption key and encrypts communication with other mobile devices using the third encryption key.

7. The method of claim 6, wherein the encrypted communication includes one or more of the following: voice, message, file sharing, mail, and VPN.

8. The method of claim 6, wherein the first encryption key is generated by on-board security in the mobile device.

* * * * *